US012525847B2

United States Patent
Yanagihara et al.

(10) Patent No.: US 12,525,847 B2
(45) Date of Patent: Jan. 13, 2026

(54) VEHICLE DRIVE DEVICE

(71) Applicants: AISIN CORPORATION, Kariya (JP); MITSUBISHI JIDOSHA KOGYO KABUSHIKI KAISHA, Tokyo (JP)

(72) Inventors: Yuki Yanagihara, Kariya (JP); Naoki Takahashi, Tokyo (JP); Kiminobu Terao, Tokyo (JP); Takuya Ogasawara, Okazaki (JP); Yosuke Morimoto, Okazaki (JP)

(73) Assignees: AISIN CORPORATION, Aichi (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 308 days.

(21) Appl. No.: 18/552,513

(22) PCT Filed: Mar. 28, 2022

(86) PCT No.: PCT/JP2022/014882
§ 371 (c)(1),
(2) Date: Sep. 26, 2023

(87) PCT Pub. No.: WO2022/210490
PCT Pub. Date: Oct. 6, 2022

(65) Prior Publication Data
US 2024/0186859 A1 Jun. 6, 2024

(30) Foreign Application Priority Data
Mar. 30, 2021 (JP) .................................. 2021-058608

(51) Int. Cl.
*H02K 5/22* (2006.01)
*B60K 1/02* (2006.01)
(Continued)

(52) U.S. Cl.
CPC ............... *H02K 5/225* (2013.01); *B60K 1/02* (2013.01); *F16H 57/031* (2013.01);
(Continued)

(58) Field of Classification Search
CPC ........ H02K 5/225; H02K 7/116; H02K 7/006; H02K 11/33; B60K 1/02; B60K 7/0007;
(Continued)

(56) References Cited

U.S. PATENT DOCUMENTS

2009/0250275 A1 10/2009 Yoshida
2018/0141423 A1* 5/2018 Makino .................... F16H 1/08
(Continued)

FOREIGN PATENT DOCUMENTS

JP 2007118808 A 5/2007
JP 2017184523 A 10/2017
JP 2021028184 A 2/2021

OTHER PUBLICATIONS

International Search Report (PCT/ISA/210) with English translation and Written Opinion (PCT/ISA/237) mailed on May 31, 2022, by the Japanese Patent Office as the International Searching Authority for International Application No. PCT/JP2022/014882.

*Primary Examiner* — Timothy Hannon
(74) *Attorney, Agent, or Firm* — BUCHANAN INGERSOLL & ROONEY PC

(57) ABSTRACT

A first rotating electric machine and a second rotating electric machine are spaced apart from each other in an axial direction. An inverter unit is disposed between the first rotating electric machine and the second rotating electric machine in the axial direction in such a manner as to overlap the first rotating electric machine and the second rotating electric machine as viewed in the axial direction. A case includes a case body member that has, in an integrated manner: a partition wall section; a section being other than (Continued)

the partition wall section and serving as at least a portion of a first containment chamber; and a second containment chamber section being a section other than the partition wall section and serving as at least a portion of the second containment chamber.

16 Claims, 8 Drawing Sheets

(51) Int. Cl.
    *F16H 57/031*     (2012.01)
    *F16H 57/037*     (2012.01)
    *H02K 7/116*     (2006.01)
    *H02K 11/33*     (2016.01)
    *B60K 7/00*     (2006.01)
    *B60K 17/16*     (2006.01)
    *F16H 57/02*     (2012.01)

(52) U.S. Cl.
    CPC .......... *F16H 57/037* (2013.01); *H02K 7/116* (2013.01); *H02K 11/33* (2016.01); *B60K 7/0007* (2013.01); *B60K 2007/0061* (2013.01); *B60K 17/165* (2013.01); *F16H 2057/02034* (2013.01)

(58) Field of Classification Search
    CPC .......... B60K 2007/0061; B60K 17/165; F16H 57/031; F16H 57/037; F16H 2057/02034
    See application file for complete search history.

(56) References Cited

U.S. PATENT DOCUMENTS

2018/0339695 A1* 11/2018 Kawahara ............ B60K 17/165
2020/0284338 A1* 9/2020 Suyama ................ B60L 15/20

* cited by examiner

VEHICLE DRIVE DEVICE

TECHNICAL FIELD

The disclosure here relates to a vehicle drive device that includes a first rotating electric machine, a second rotating electric machine, a motive power transmission mechanism, an inverter unit configured to drive the first rotating electric machine and the second rotating electric machine, and a case.

BACKGROUND ART

JP 2017-184523A (Patent Document 1) discloses an example of this type of vehicle drive device. In the following description of the background art, the reference numerals in Patent Document 1 are cited in parentheses.

A drive device (D) of Patent Document 1 as a vehicle drive device includes two electric motors (1), namely a first rotating electric machine and a second rotating electric machine, a decelerator (5) as a motive power transmission mechanism, and an inverter (3) as an inverter unit. Patent Document 1 describes a technology for integrating, with an inverter housing (19), a speed reducer housing (11) that accommodates a speed reducer (5) in a drive device (D) in which an electric motor housing (23) that accommodates an electric motor (1) is integrated with the inverter housing (19) that accommodates the inverter (3). According to Patent Document 1, a compact structure of the entire drive unit (D) can be realized by thus integrating the inverter housing (19) with the speed reducer housing (11). Note that "integrating" two housings in Patent Document 1 means coupling these two housings with bolts, as described in paragraphs 0018 and 0019 of Patent Document 1.

PRIOR ART DOCUMENTS

Patent Documents

Patent Document 1: JP 2017-184523A

DISCLOSURE

Problem to be Solved

In the vehicle drive device of Patent Document 1, the inverter housing has a plurality of case members that are bolted together, and the electric motor housing has a plurality of case members that are bolted together separately from the case members constituting the inverter housing, as shown in FIG. 2 of Patent Document 1. This configuration tends to increase the number of components of the case.

There is a demand to realize a technology that makes it easier to reduce the number of components of the case that accommodates the first rotating electric machine, the second rotating electric machine, the motive power transmission mechanism, and the inverter unit.

Means for Solving Problem

A vehicle drive device according to the present disclosure comprises: a first rotating electric machine; a second rotating electric machine; a first output member drivably coupled to a first wheel; a second output member drivably coupled to a second wheel; a motive power transmission mechanism; an inverter unit configured to drive the first rotating electric machine and the second rotating electric machine; and a case, the motive power transmission mechanism including: a first transmission system configured to transmit torque of the first rotating electric machine to at least the first output member; and a second transmission system configured to transmit torque of the second rotating electric machine to at least the second output member, the first rotating electric machine and the second rotating electric machine being disposed on a first axis, the first output member and the second output member being disposed on a second axis different from the first axis, which is located above the second axis, the first rotating electric machine and the second rotating electric machine being spaced apart from each other in an axial direction parallel to the first axis and the second axis, the inverter unit being disposed between the first rotating electric machine and the second rotating electric machine in the axial direction in such a manner as to overlap the first rotating electric machine and the second rotating electric machine as viewed in the axial direction, the case including: a first containment chamber accommodating the first rotating electric machine, the second rotating electric machine, the first output member, the second output member, and the motive power transmission mechanism; a second containment chamber accommodating the inverter unit; and a case body member having, in an integrated manner: a partition wall section being a section serving as a partition wall demarcating the first containment chamber and the second containment chamber; a section being other than the partition wall section and serving as at least a portion of the first containment chamber; and a second containment chamber section being a section other than the partition wall section and serving as at least a portion of the second containment chamber.

According to this configuration, the member that includes the partition wall section also includes the section serving as at least a portion of the first containment chamber and the section serving as at least a portion of the second containment chamber. This makes it easier to reduce the number of components of the case that accommodates the first rotating electric machine, the second rotating electric machine, the motive power transmission mechanism, and the inverter unit compared to the case where the member that includes the partition wall section does not include these two sections. It is also possible to reduce the number of joints in the case and reduce the size of the vehicle drive device by reducing the number of components of the case.

This configuration also has the following advantages. That is, when the first rotating electric machine and the second rotating electric machine are spaced apart from each other in the axial direction on the same axis as described above, the region between the first rotating electric machine and the second rotating electric machine in the axial direction that overlaps the first rotating electric machine and the second rotating electric machine as viewed in the axial direction is likely to be a dead space. According to this configuration, the inverter unit can be disposed with use of the region that is thus likely to be a dead space, thereby preventing an increase in the size of the vehicle drive device due to disposing the inverter unit.

Further features and advantages of the vehicle drive device will become clear from the following description of embodiments, which will be described with reference to the drawings.

BRIEF DESCRIPTION OF THE DRAWINGS

FIG. 6 is a perspective view in which a case of the vehicle drive device according to the embodiment is seen through.

FIG. 7 is a perspective view in which the case of the vehicle drive device according to the embodiment is seen through.

DETAILED DESCRIPTION

Figure 1:
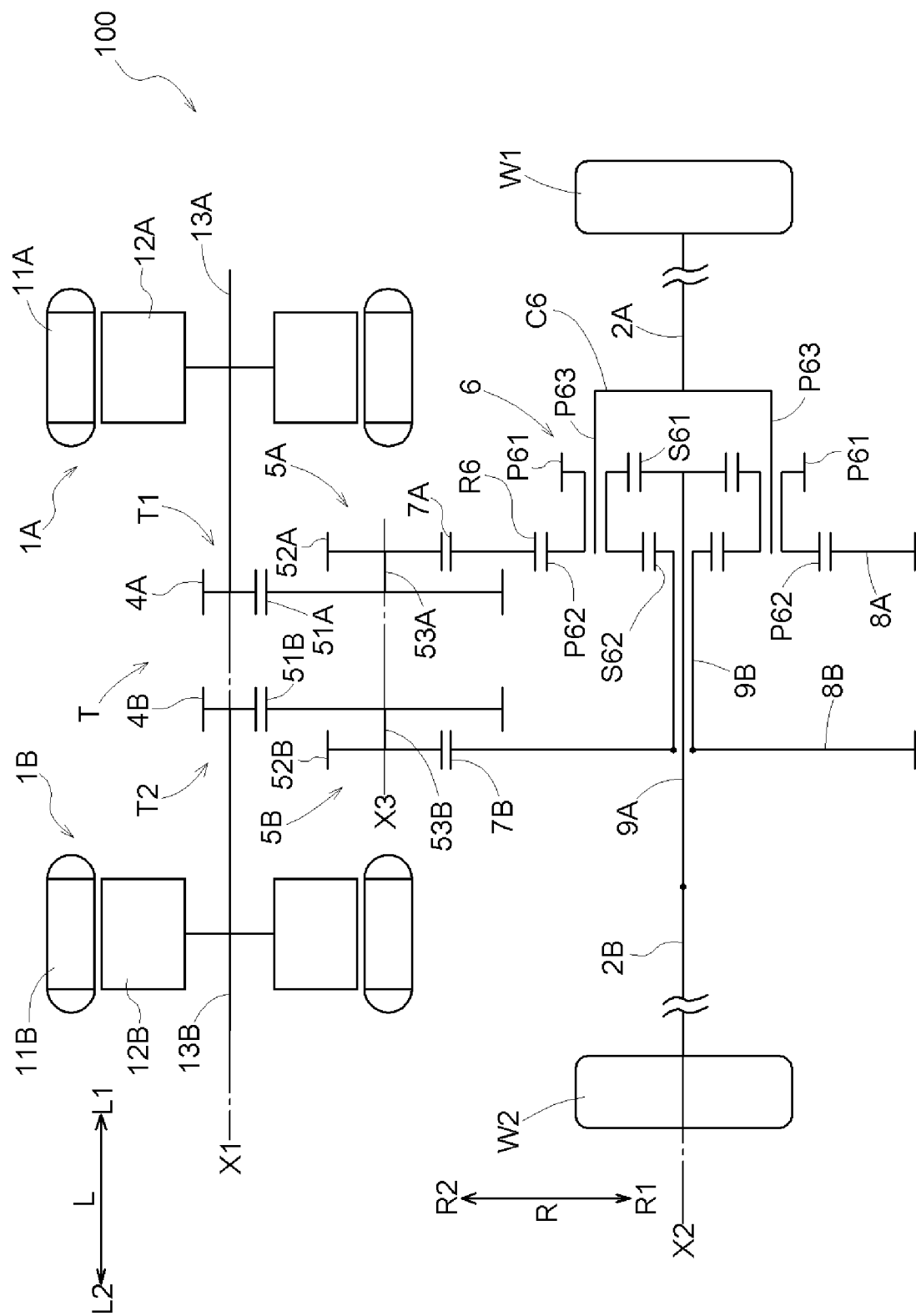
FIG. 1 is a single line diagram of a vehicle drive device according to an embodiment.

An embodiment of a vehicle drive device will be described with reference to the drawings. In this embodiment, a third cover member 31C corresponds to a "cover member". A first side wall 40A (specifically, a part of the first side wall 40A), a second side wall 40B (specifically, a part of the second side wall 40B), a third side wall 40C, and a fourth side wall 40D each correspond to a "wall section". A third side wall 40C and a fourth side wall 40D each correspond to a joint wall. A first partition wall 61A, a second partition wall 61B, and a third partition wall 61C each correspond to a "partition wall". A first containment chamber section 62A corresponds to a "section being other than the partition wall section and serving as at least a portion of a first containment chamber". A second containment chamber section 62B corresponds to a "section being other than the partition wall section and serving as at least a portion of a second containment chamber".

In this specification, the term "rotating electric machine" is used as a concept that includes a motor (electric motor), a generator (generator), and a motor-generator that performs the functions of both a motor and a generators as necessary.

In this specification, "overlapping as viewed in a specific direction" regarding disposal of two members means that when a virtual straight line parallel to the viewing direction is moved in any direction orthogonal to this virtual straight line, a region where the virtual straight line intersects both of the two members exists, at least in part. In this specification, "regions in the axial direction in which two members are disposed overlapping each other" regarding disposal of two members means that the region in the axial direction where one member is disposed includes at least a part of the region in the axial direction where the other member is disposed.

In this specification, "being drivably coupled" refers to a state where two rotating elements are coupled in such a manner as to be capable of transmitting driving force, and includes a state where the two rotating elements are coupled in such a manner as to be capable of rotating integrally, or a state where the two rotating elements are coupled in such a manner as to be capable of transmitting driving force via one or more transmission members. Examples of the transmission members include various members (e.g. shafts, gear mechanisms, belts, chains etc.) that transmit rotation at the same speed or at variable speeds. Note that the transmission members may also include an engagement device (e.g. friction engagement device, intermeshing engagement device etc.) that selectively transmits rotation and driving force. However, when the expression "being drivably coupled" is used regarding rotating elements of a differential gear mechanism, this expression refers to a state where three or more rotating elements included in the differential gear mechanism are drivably coupled, not via any other rotating element.

Figure 2:
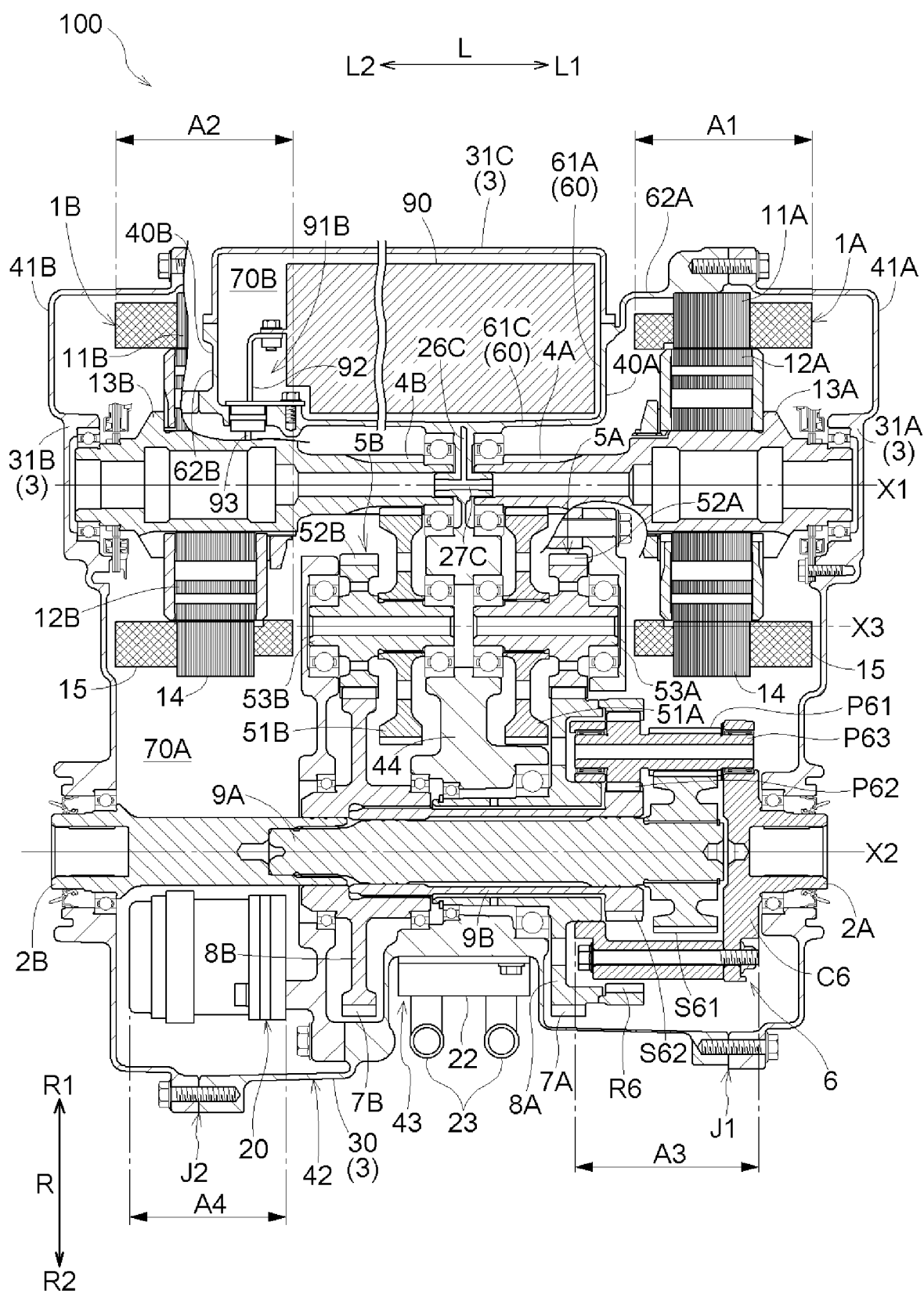
FIG. 2 is a cross-sectional diagram of the vehicle drive device according to the embodiment.

A vehicle drive device 100 includes a first rotating electric machine 1A, a second rotating electric machine 1B, a first output member 2A that is drivably coupled to a first wheel W1, a second output member 2B that is drivably coupled to a second wheel W2, and a motive power transmission mechanism T, as shown in FIG. 1. The vehicle drive device 100 also includes a case 3 that accommodates the first rotating electric machine 1A, the second rotating electric machine 1B, the first output member 2A, the second output member 2B, and the motive power transmission mechanism T, as shown in FIG. 2. In the example shown in FIG. 2, a part of the first output member 2A and a part of the second output member 2B are exposed outside the case 3.

The first wheel W1 and the second wheel W2 are a pair of left and right wheels (e.g. a pair of left and right front wheels or a pair of left and right rear wheels) of a vehicle (a vehicle in which the vehicle drive device 100 is mounted). The first output member 2A of this embodiment is coupled to the first wheel W1 in an integrally rotatable manner, and the second output member 2B is coupled to the second wheel W2 in an integrally rotatable manner. The first output member 2A is coupled to the first wheel W1 via a constant velocity joint, for example, and the second output member 2B is coupled to the second wheel W2 via a constant velocity joint, for example.

The motive power transmission mechanism T includes a first transmission system T1 that transmits torque of the first rotating electric machine 1A to at least the first output member 2A, and a second transmission system T2 that transmits torque of the second rotating electric machine 1B to at least the second output member 2B, as shown in FIG. 1. The vehicle drive device 100 causes the vehicle to travel by transmitting torque of the first rotating electric machine 1A to at least the first output member 2A and transmitting torque of the second rotating electric machine 1B to at least the second output member 2B. The first rotating electric machine 1A and the second rotating electric machine 1B are electrically connected to a power storage device (not shown) via a later-described inverter unit 90. The first rotating electric machine 1A and the second rotating electric machine 1B are powered by electric power supplied from the power storage device, or supply electric power generated by the inertia of the vehicle, for example, to the power storage device, which stores the supplied power. The first rotating electric machine 1A and the second rotating electric machine 1B of this embodiment are independently rotatable relative to each other.

The first transmission system T1 of this embodiment transmits torque of the first rotating electric machine 1A to the first output member 2A and the second output member 2B, and the second transmission system T2 transmits torque of the second rotating electric machine 1B to the first output member 2A and the second output member 2B. That is, a portion of the first transmission system T1 on the side opposite to the first rotating electric machine 1A side and a portion of the second transmission system T2 on the side opposite to the second rotating electric machine 1B side are constituted by a common transmission system. The motive power transmission mechanism T distributes and transmit torque of the first rotating electric machine 1A and torque of the second rotating electric machine 1B to the first output member 2A and the second output member 2B.

The first rotating electric machine 1A and the second rotating electric machine 1B are disposed on a first axis X1, and the first output member 2A and the second output member 2B are disposed on a second axis X2, which is different from the first axis X1. The first axis X1 and the second axis X2 are parallel to each other. Here, an axial direction L refers to a direction parallel to the first axis X1 and the second axis X2. A first side L1 in the axial direction L refers to a side in the axial direction L on which the first rotating electric machine 1A is disposed relative to the second rotating electric machine 1B, and a second side L2 in the axial direction L refers to the side opposite to the first side L1 in the axial direction L. The first transmission system T1 of this embodiment includes a first counter gear mechanism 5A, and the second transmission system T2 includes a second counter gear mechanism 5B. The first counter gear mechanism 5A and the second counter gear mechanism 5B are disposed on a third axis X3, which is different from the first axis X1 and the second axis X2. The first axis X1, the second axis X2, and the third axis X3 are parallel to each other. The first axis X1, the second axis X2, and the third axis X3 are virtual axes.

Figure 4:
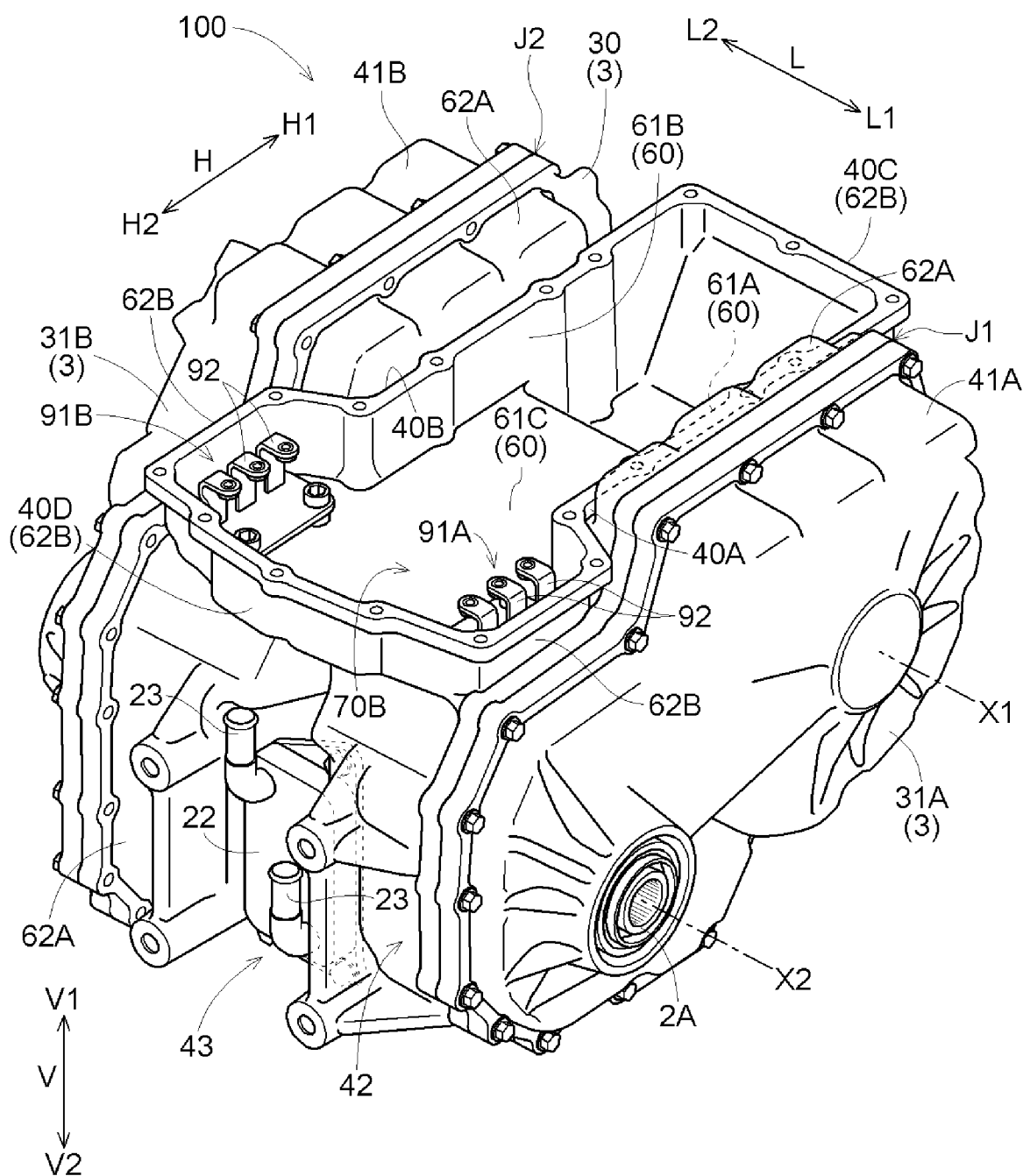
FIG. 4 is a perspective view of a part of the vehicle drive device according to the embodiment.

The vehicle drive device 100 of this embodiment is mounted in the vehicle with the axial direction L parallel to the left-right direction of the vehicle. Specifically, the vehicle drive device 100 is mounted in the vehicle such that the first side L1 in the axial direction L coincides with the left side of the vehicle, and the second side L2 in the axial direction L coincides with the right side of the vehicle. A width direction H refers to a direction orthogonal to the axial direction L as viewed in the up-down direction V (as viewed in a direction parallel to the up-down direction V (vertical direction)) with the vehicle drive device 100 mounted in the vehicle, as shown in FIG. 4. Further, a first side H1 in the width direction H refers to one side in the width direction H, and a second side H2 in the width direction H refers to the other side in the width direction H. Specifically, the first side H1 in the width direction H refers to the side in the width direction H on which the first axis X1 is located relative to the second axis X2, and the second side H2 in the width direction H refers to the side opposite to the first side H1 in the width direction H. The width direction H of this embodiment coincides with the front-rear direction of the vehicle. Specifically, the first side H1 in the width direction H coincides with the rear side of the vehicle, and the second side H2 in the width direction H coincides with the front side of the vehicle.

The first rotating electric machine 1A includes a first stator 11A fixed to the case 3, and a first rotor 12A rotatably supported relative to the first stator 11A, as shown in FIGS. 1 and 2. The second rotating electric machine 1B includes a second stator 11B fixed to the case 3, and a second rotor 12B rotatably supported relative to the second stator 11B. Thus, the first rotating electric machine 1A that includes the first rotor 12A serves as a first driving force source that outputs torque transmitted by the first transmission system T1, and the second rotating electric machine 1B that includes the second rotor 12B serves as a second driving force source that outputs torque transmitted by the second transmission system T2. The first rotating electric machine 1A and the second rotating electric machine 1B of this embodiment are rotating electric machines of an inner-rotor type. Thus, the first rotor 12A is disposed inward in the radial direction of the first stator 11A (a radial direction based on the first axis X1), and the second rotor 12B is disposed inward in the radial direction of the second stator 11B (a radial direction based on the first axis X1).

As shown in FIG. 2, in this embodiment, a first disposal region A1, which is a region in the axial direction L where the first rotating electric machine 1A is disposed, coincides with the disposal region of the first stator 11A in the axial direction L. A second disposal region A2, which is a region in the axial direction L where the second rotating electric machine 1B is disposed, coincides with the disposal region of the second stator 11B in the axial direction L. The first stator 11A and the second stator 11B each have a stator core 14 and a coil end section 15 protruding from the stator core 14 toward both sides in the axial direction L. The coil end section 15 on the first side L1 in the axial direction L is constituted by a portion of a coil wound on the stator core 14 that protrudes from the stator core 14 toward the first side L1 in the axial direction L. The coil end section 15 on the second side L2 in the axial direction L is constituted by a portion of the coil wound on the stator core 14 that protrudes from the stator core 14 toward the second side L2 in the axial direction L. The disposal region in the axial direction L where the first stator 11A and the second stator 11B are disposed is a region in the axial direction L between an end, on the first side L1 in the axial direction L, of the coil end section 15 disposed on the first side L1 in the axial direction L and an end, on the second side L2 in the axial direction L, of the coil end section 15 disposed on the second side L2 in the axial direction L.

In this embodiment, the outside diameter of the first rotating electric machine 1A is equal to the outside diameter of the second rotating electric machine 1B. Specifically, the outside diameter of the stator core 14 of the first stator 11A is equal to the outside diameter of the stator core 14 of the second stator 11B.

The first transmission system T1 includes a first input gear 4A that is coupled to the first rotor 12A in an integrally rotatable manner. The second transmission system T2 includes a second input gear 4B that is coupled to the second rotor 12B in an integrally rotatable manner. Specifically, the first rotor 12A is coupled to a first rotor shaft 13A in an integrally rotatable manner. The first input gear 4A is located on an outer face of a portion of the first rotor shaft 13A on the second side L2 in the axial direction L relative to the first rotor 12A. The second rotor 12B is coupled to a second rotor shaft 13B in an integrally rotatable manner. The second input gear 4B is located on an outer face of a portion of the second rotor shaft 13B on the first side L1 in the axial direction L relative to the second rotor 12B.

In this embodiment, the first transmission system T1 includes the first counter gear mechanism 5A, and the second transmission system T2 includes the second counter gear mechanism 5B, as mentioned above. The first counter gear mechanism 5A includes a first counter input gear 51A that meshes with the first input gear 4A, and a first counter output gear 52A that integrally rotates with the first counter input gear 51A. The first counter output gear 52A is coupled to the first counter input gear 51A in an integrally rotatable manner, via a first counter shaft 53A. The first counter output gear 52A of this embodiment is disposed on the first side L1 in the axial direction L relative to the first counter input gear 51A. The second counter gear mechanism 5B includes a second counter input gear 51B that meshes with the second input gear 4B, and a second counter output gear 52B that integrally rotates with the second counter input gear 51B. The second counter output gear 52B is coupled to the second counter input gear 51B in an integrally rotatable manner, via a second counter shaft 53B. The second counter output gear 52B of this embodiment is disposed on the second side L2 in the axial direction L relative to the second counter input gear 51B.

In this embodiment, the first transmission system T1 includes a first differential input gear 7A, and the second transmission system T2 includes a second differential input gear 7B. The first differential input gear 7A is a gear that is disposed on the second axis X2 and to which the rotation of the first rotating electric machine 1A is input. The second differential input gear 7B is a gear that is disposed on the second axis X2 and to which the rotation of the second rotating electric machine 1B is input. The first differential input gear 7A of this embodiment is a gear meshing with the first counter output gear 52A, and receives the input of rotation of the first rotating electric machine 1A via the first counter gear mechanism 5A. The second differential input gear 7B of this embodiment is a gear meshing with the second counter output gear 52B, and receives the input of rotation of the second rotating electric machine 1B via the second counter gear mechanism 5B. The first differential input gear 7A of this embodiment has the same diameter as the second differential input gear 7B.

The motive power transmission mechanism T of this embodiment distributes and transmits torque of the first rotating electric machine 1A and torque of the second rotating electric machine 1B to the first output member 2A and the second output member 2B, as mentioned above. Specifically, the motive power transmission mechanism T has a differential gear mechanism 6 that distributes torque of the first rotating electric machine 1A transmitted to the first differential input gear 7A and torque of the second rotating electric machine 1B transmitted to the second differential input gear 7B, to the first output member 2A and the second output member 2B. The differential gear mechanism 6 has four rotating elements, namely a first input rotating element that is drivably coupled to the first differential input gear 7A, a second input rotating element that is drivably coupled to the second differential input gear 7B, a first output rotating element that is drivably coupled to the first output member 2A, and a second output rotating element that is drivably coupled to the second output member 2B. The rotation speeds of these four rotation elements are in the descending order from the first input rotating element to the first output rotating element, the second output rotating element, and the second input rotating element.

Note that the order of rotation speed refers to the order of rotation speed when each rotating element is in a rotating state. The rotation speed of each rotating element varies with the rotation state of the differential gear mechanism 6, but the order of rotation speed of the rotating elements is constant because the order of rotation speed is determined by the structure of the differential gear mechanism 6. The order of rotation speed of the rotating elements is equal to the order in which in the rotating elements are disposed in a velocity diagram (also called an alignment diagram).

The differential gear mechanism 6 of this embodiment is a planetary gear system (specifically, a Ravigneaux planetary gear system) with four rotating elements. Specifically, the differential gear mechanism 6 includes four rotating elements, namely a first sun gear S61, a second sun gear S62, a carrier C6, and a ring gear R6. The carrier C6 rotatably supports a first pinion gear P61 and a second pinion gear P62, which integrally rotate with respect to each other, via a pinion shaft P63. The first pinion gear P61 has a smaller diameter than the second pinion gear P62. The first pinion gear P61 meshes with the first sun gear S61, and the second pinion gear P62 meshes with the second sun gear S62 and also meshes with the ring gear R6.

The ring gear R6 is the first input rotating element that is drivably coupled to the first differential input gear 7A. Here, the ring gear R6 is coupled to the first differential input gear 7A in an integrally rotatable manner. Specifically, the first differential input gear 7A is located on an outer circumferential face of a first coupling member 8A, and the ring gear R6 is coupled to the first coupling member 8A in an integrally rotatable manner.

The second sun gear S62 is the second input rotating element that is drivably coupled to the second differential input gear 7B. Here, the second sun gear S62 is coupled to the second differential input gear 7B in an integrally rotatable manner. Specifically, the second differential input gear 7B is located on an outer circumferential face of a second coupling member 8B, and the second sun gear S62 is coupled to the second coupling member 8B in an integrally rotatable manner, via a second coupling shaft 9B.

The carrier C6 is the first output rotating element that is drivably coupled to the first output member 2A. Here, the carrier C6 is coupled to the first output member 2A in an integrally rotatable manner. The first sun gear S61 is the second output rotating element that is drivably coupled to the second output member 2B. Here, the first sun gear S61 is coupled to the second output member 2B in an integrally rotatable manner. Specifically, the first sun gear S61 is coupled to the second output member 2B in an integrally rotatable manner, via a first connecting shaft 9A.

Figure 3:
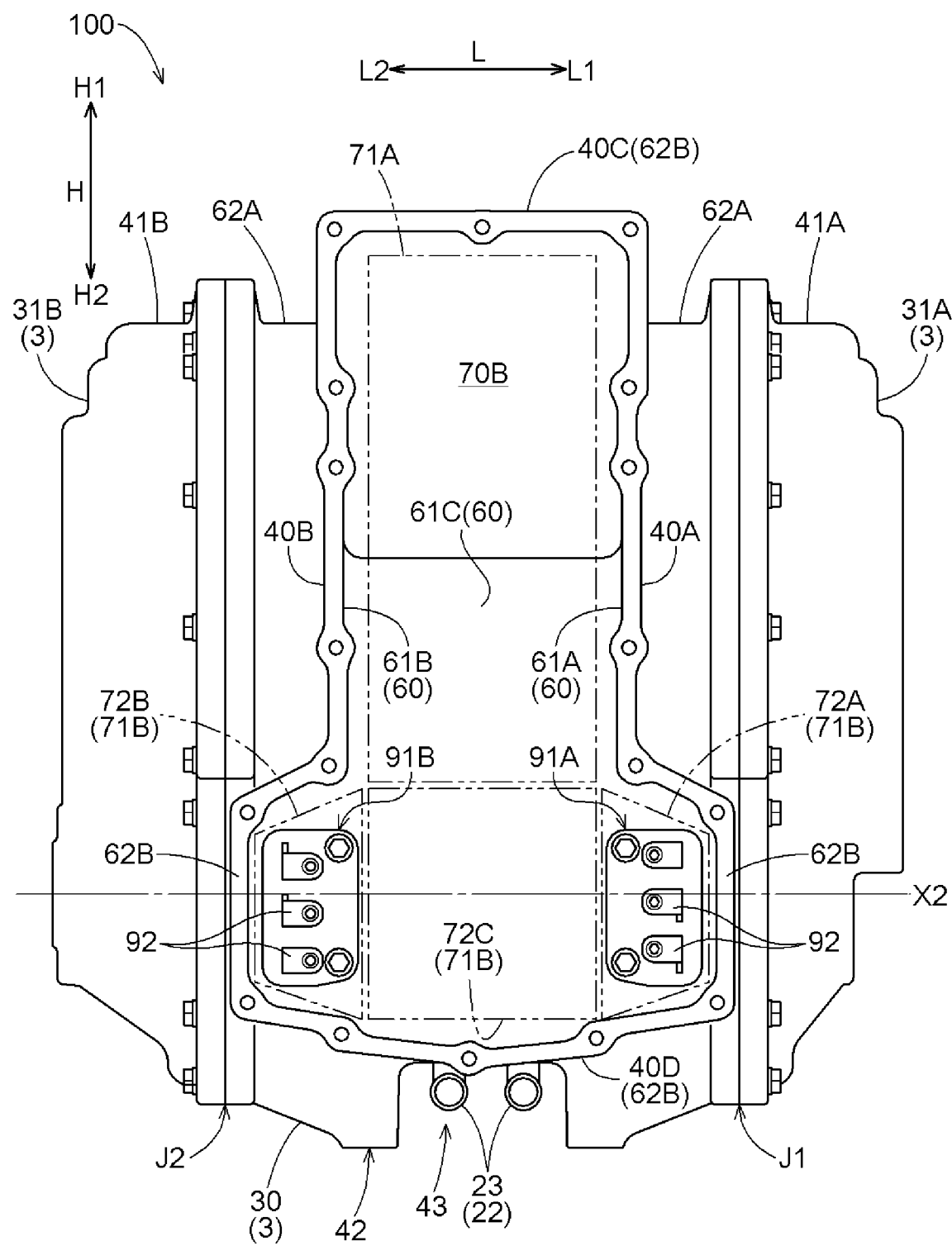
FIG. 3 is a plan view of a part of the vehicle drive device according to the embodiment.

The vehicle drive device 100 includes a case 3. The case 3 of this embodiment includes a case body member 30, a first cover member 31A, and a second cover member 31B, as shown in FIGS. 2 to 4. The case body member 30, the first cover member 31A, and the second cover member 31B are joined to each other, and are joined to each other with use of bolts in this embodiment.

The first cover member 31A is disposed on the first side L1 in the axial direction L relative to the case body member 30, and is joined to the case body member 30 at a first joint J1. The first cover member 31A is joined to the case body member 30 in such a manner as to close an opening section of the case body member 30 on the first side L1 in the axial direction L. The second cover member 31B is disposed on the second side L2 in the axial direction L relative to the case body member 30, and is joined to the case body member 30 at a second joint J2. The second cover member 31B is joined to the case body member 30 in such a manner as to close an opening section of the case body member 30 on the second side L2 in the axial direction L.

A space surrounded by the case body member 30, the first cover member 31A, and the second cover member 31B accommodates the first rotating electric machine 1A, the second rotating electric machine 1B, the first output member 2A, the second output member 2B, and the motive power transmission mechanism T. That is, the case 3 includes a first containment chamber 70A that accommodates the first rotating electric machine 1A, the second rotating electric machine 1B, the first output member 2A, the second output member 2B, and the motive power transmission mechanism T. The first containment chamber 70A is surrounded by the case body member 30, the first cover member 31A, and the second cover member 31B. The first containment chamber 70A of this embodiment also accommodates a later-described oil pump 20.

The case 3 of this embodiment includes a supporter 44, as shown in FIG. 2. The supporter 44 has a wall shape extending along a plane orthogonal to the axial direction L, for example. The supporter 44 may be a part of the case body member 30 or a separate member from the case body member 30. The supporter 44 is disposed between the first rotating electric machine 1A and the second rotating electric machine 1B in the axial direction L. In this embodiment, the supporter 44 is disposed in a middle area between the first rotating electric machine 1A and the second rotating electric machine 1B in the axial direction L. The first rotating electric machine 1A, the first counter gear mechanism 5A, and the first differential input gear 7A are accommodated in a section of the first containment chamber 70A on the first side L1 in the axial direction L relative to the supporter 44. The second rotating electric machine 1B, the second counter gear mechanism 5B, and the second differential input gear 7B are accommodated in a section of the first containment chamber 70A on the second side L2 in the axial direction L relative to the supporter 44. The differential gear mechanism 6 of this embodiment is accommodated in a section of the first containment chamber 70A on the first side L1 in the axial direction L relative to the supporter 44.

The vehicle drive device 100 includes an inverter unit 90 that drives the first rotating electric machine 1A and the second rotating electric machine 1B, as shown in FIG. 2. Although the inverter unit 90 is simplified in FIG. 2, the inverter unit 90 includes an inverter (inverter circuit) that converts electric power between DC power and AC power, and components associated with the inverter. The inverter is, for example, a power module that includes a plurality of modularized elements (switching elements etc.). The components associated with the inverter are, for example, a first terminal block 91A and a second terminal block 91B shown in FIGS. 2 to 4, a control board with a controller for controlling the inverter mounted thereon, a smoothing capacitor that smooths the voltage across positive and negative electrodes on the DC side of the inverter, or the like.

Figure 5:
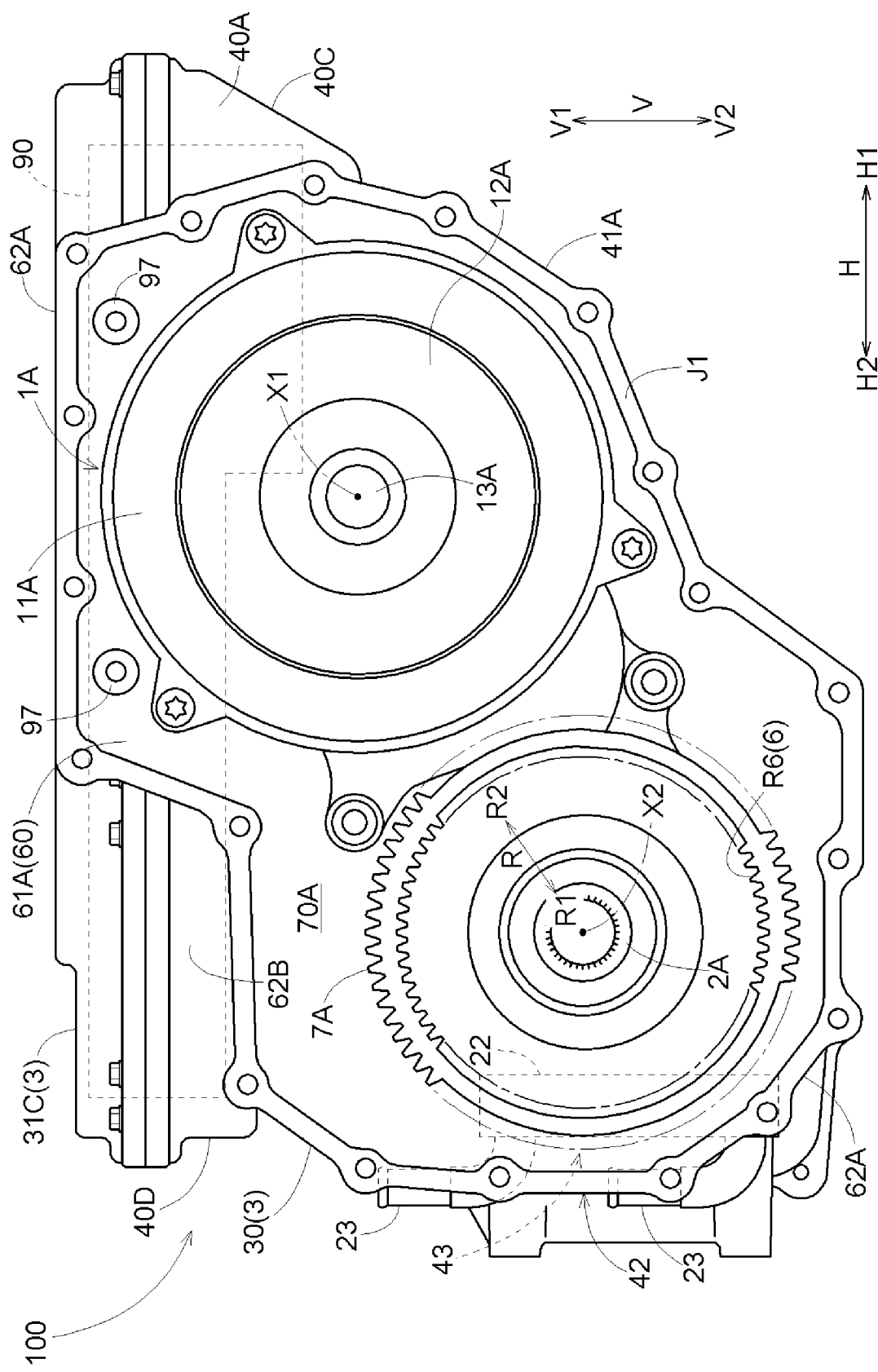
FIG. 5 is a side view of a part of the vehicle drive device according to the embodiment.

The first axis X1 is located on the upper side V1 relative to the second axis X2 and on one side in the width direction H (specifically, on the first side H1 in the width direction H) relative to the second axis X2, as shown in FIG. 5. The first rotating electric machine 1A and the second rotating electric machine 1B are spaced apart from each other in the axial direction L, as shown in FIG. 2. As shown in FIGS. 2 and 5, the inverter unit 90 is disposed between the first rotating electric machine 1A and the second rotating electric machine 1B in the axial direction L in such a manner as to overlap the first rotating electric machine 1A and the second rotating electric machine 1B as viewed in the axial direction L (as viewed in a direction parallel to the axial direction L). Further, the inverter unit 90 is disposed on the upper side V1 relative to the second axis X2 in such a manner as to overlap at least some of the members disposed on the second axis X2 as viewed in the up-down direction V.

In this vehicle drive device 100, the first rotating electric machine 1A and the second rotating electric machine 1B are disposed on the same axis and spaced apart in the axial direction L. Thus, a region between the first rotating electric machine 1A and the second rotating electric machine 1B in the axial direction L that overlaps the first rotating electric machine 1A and the second rotating electric machine 1B as viewed in the axial direction L is likely to be a dead space. In addition, a region on the upper side V1 relative to the second axis X2 is also likely to be a dead space since the first axis X1 is located on the upper side V1 relative to the second axis X2 and on the first side H1 in the width direction H relative to the second axis X2. In the vehicle drive device 100, in which the inverter unit 90 is disposed as described above, the inverter unit 90 can be disposed with use of the two regions that are likely to be dead spaces, thus preventing an increase in the size of the vehicle drive device 100 due to disposing the inverter unit 90. Particularly, the disposal region of the inverter unit 90 as viewed in the up-down direction V can be widely secured by using the region between the first rotating electric machine 1A and the second rotating electric machine 1B in the axial direction L and the region on the upper side V1 relative to the second axis X2 as a disposal region of the inverter unit 90. This makes it easier to keep small the dimensions the disposal region of the inverter unit 90 in the up-down direction. The inverter unit 90 can thus be disposed in an upper section of the vehicle drive device 100 while preventing an increase in the size of the vehicle drive device 100 in the up-down direction V.

The inverter unit 90 of this embodiment overlaps at least portions of the first rotating electric machine 1A and the second rotating electric machine 1B that are disposed on the upper side V1 relative to the first axis X1, as viewed in the axial direction L (see FIG. 5). The inverter unit 90 of this embodiment is disposed on the upper side V1 relative to the first differential input gear 7A and the second differential input gear 7B in such a manner as to overlap the first differential input gear 7A and the second differential input gear 7B as viewed in the up-down direction V, as is clear from the positional relationship in the axial direction L between the inverter unit 90 and the first differential input gear 7A and between the inverter unit 90 and the second differential input gear 7B shown in FIG. 2, and the positional relationship in the up-down direction V between the inverter unit 90 and the first differential input gear 7A shown in FIG. 5. That is, in this embodiment, "at least some of the members disposed on the second axis X2" mentioned above include the first differential input gear 7A and the second differential input gear 7B. Also, the inverter unit 90 of this embodiment is disposed on the upper side V1 relative to the second axis X2 in such a manner as to overlap the second axis X2 as viewed in the up-down direction V.

Figure 8:
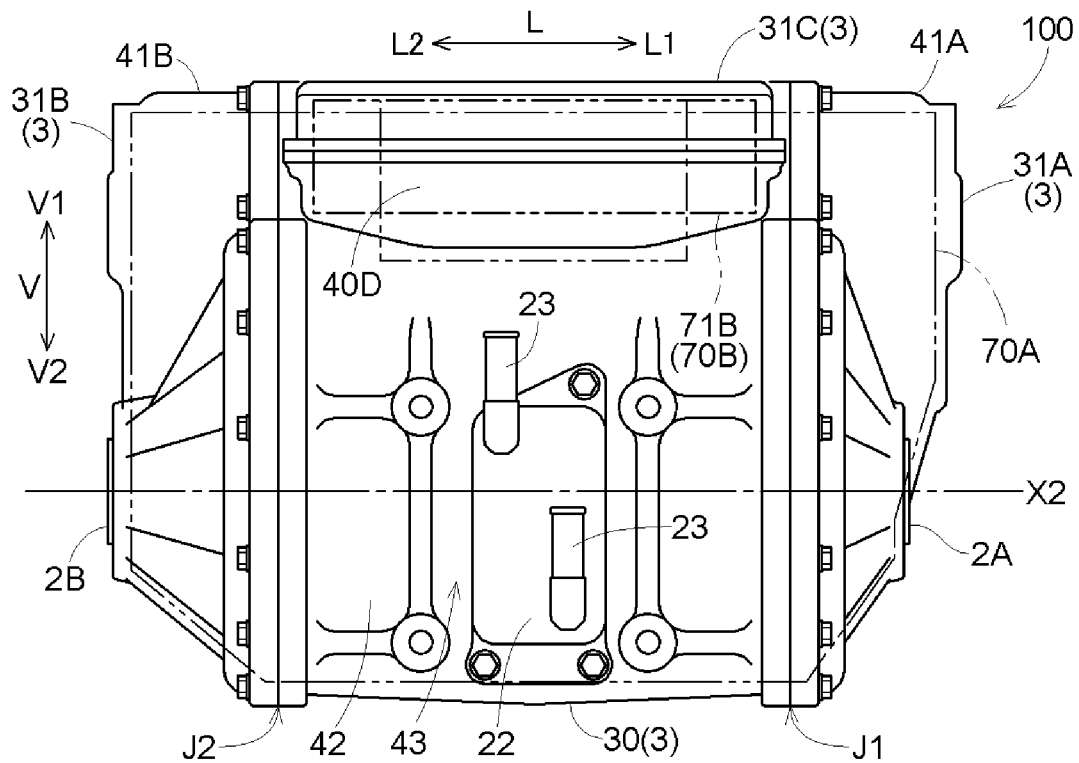
FIG. 8 is a front view of the vehicle drive device according to the embodiment.

The inverter unit 90 of this embodiment is accommodated in the case 3. That is, the case 3 includes a second containment chamber 70B that accommodates the inverter unit 90, in addition to the aforementioned first containment chamber 70A. Specifically, the case 3 includes a third cover member 31C in addition to the case body member 30, the first cover member 31A, and the second cover member 31B, as shown in FIGS. 2, 5, and 8. The third cover member 31C is located on the upper side V1 relative to the case body member 30 and is joined to the case body member 30 in such a manner as to close an opening section (see FIG. 4) of the case body member 30 that faces toward the upper side V1. The third cover member 31C of this embodiment is joined to the case body member 30 with use of bolts. The inverter unit 90 is accommodated in a space surrounded by the case body member 30 and the third cover member 31C. That is, the second containment chamber 70B is surrounded by the case body member 30 and the third cover member 31C.

The case body member 30 includes a first side wall 40A constituting a side wall of the second containment chamber 70B on the first side L1 in the axial direction L, a second side wall 40B constituting a side wall of the second containment chamber 70B on the second side L2 in the axial direction L, a third side wall 40C constituting a side wall of the second containment chamber 70B on the first side H1 in the width direction H, and a fourth side wall 40D constituting a side wall of the second containment chamber 70B on the second side H2 in the width direction H, as shown in FIGS. 3 and 4. The first side wall 40A, the second side wall 40B, the third side wall 40C and the fourth side wall 40D are integrated with the case body member 30. A portion of the first side wall 40A on the second side H2 in the width direction H is disposed further on the first side L1 in the axial direction L relative to a portion of the first side wall 40A on the first side H1 in the width direction H, and forms a later-described first region 72A. A portion of the second side wall 40B on the second side H2 in the width direction H is disposed further on the second side L2 in the axial direction L relative to a portion of the second side wall 40B on the first side H1 in the width direction H, and forms a later-described second region 72B.

The second containment chamber 70B is surrounded by the first side wall 40A, the second side wall 40B, the third side wall 40C, the fourth side wall 40D, a later-described third partition wall 61C, and the third cover member 31C. Thus, the third partition wall 61C of this embodiment constitutes a bottom wall of the second containment chamber 70B. In this embodiment, a portion of the third partition wall 61C on the first side H1 in the width direction H is disposed on the lower side V2 relative to a portion of the third partition wall 61C on the second side H2 in the width direction H, and the second containment chamber 70B is deeper in a section on the first side H1 in the width direction H than a section on the second side H2 in the width direction H. Further, the third side wall 40C of this embodiment (specifically, a lower portion of the third side wall 40C) is inclined toward the second side H2 in the width direction H while extending toward the lower side V2.

The case body member 30 of this embodiment has, in an integrated manner, a partition wall section 60, a first containment chamber section 62A, and a second containment chamber section 62B. That is, the case body member 30 includes the partition wall section 60, the first containment chamber section 62A, and the second containment chamber section 62B. This case body member 30 is, for example, a casting produced by means of integral molding technology with use of casting.

The partition wall section 60 is a section that forms a partition wall demarcating the first containment chamber 70A and the second containment chamber 70B. In this embodiment, one partition wall demarcates the first containment chamber 70A and the second containment chamber 70B on the first side L1 in the axial direction L, the second side L2 in the axial direction L, and the lower side, as will be described below. Specifically, the first partition wall 61A demarcates, in the axial direction L, a portion of the first containment chamber 70A that is disposed on the first side L1 in the axial direction L relative to the second containment chamber 70B (where the first rotating electric machine 1A is accommodated), and the second containment chamber 70B, as shown in FIGS. 2 to 4. Here, a part of the first side wall 40A in the width direction H (specifically, a middle portion in the width direction H) constitutes the first partition wall 61A. The second partition wall 61B demarcates, in the axial direction L, a portion of the first containment chamber 70A that is disposed on the second side L2 in the axial direction L relative to the second containment chamber 70B (where the second rotating electric machine 1B is accommodated), and the second containment chamber 70B. Here, a part of the second side wall 40B in the width direction H (specifically, a middle portion in the width direction H) constitutes the second partition wall 61B. The third partition wall 61C demarcates, in the up-down direction V, a portion of the first containment chamber 70A that is disposed on the lower side V2 relative to the second containment chamber 70B, and the second containment chamber 70B. The partition wall section 60 forms these three partition walls (specifically, the first partition wall 61A, the second partition wall 61B, and the third partition wall 61C).

The first containment chamber section 62A is a portion that is other than the partition wall section 60 and forms at least a part of the first containment chamber 70A. The first containment chamber section 62A of this embodiment forms a part of the first containment chamber 70A, as will be described below. The case 3 has a peripheral wall section that has a cylindrical shape extending in the axial direction L and surrounds the first rotating electric machine 1A (and also surrounds the differential gear mechanism 6 in this embodiment), as shown in FIGS. 2 to 5. The first containment chamber section 62A forms a portion of the peripheral wall section on the second side L2 in the axial direction L (specifically, a portion of the peripheral wall section on the second side L2 in the axial direction L relative to the first joint J1). The case 3 also has a peripheral wall section that has a cylindrical shape extending in the axial direction L and surrounds the second rotating electric machine 1B (and also surrounds the oil pump 20 in this embodiment). The first containment chamber section 62A forms a portion of the peripheral wall section on the first side L1 in the axial direction L (specifically, a portion of the peripheral wall section on the first side L1 in the axial direction L relative to the second joint J2). The case 3 also has a peripheral wall section (later-described peripheral wall section 42) that has a cylindrical shape extending in the axial direction L and surrounds the first differential input gear 7A and the second differential input gear 7B. The first containment chamber section 62A forms a part of the peripheral wall section 42 (specifically, a portion of the peripheral wall section 42 that is not included in the third partition wall 61C).

The second containment chamber section 62B is a portion that is other than the partition wall section 60 and forms at least a part of the second containment chamber 70B. In this embodiment, the second containment chamber section 62B forms portions of the first side wall 40A that do not constitute the first partition wall 61A (here, portions of the first side wall 40A on both sides in the width direction H), portions of the second side wall 40B that do not constitute the second partition wall 61B (here, portions of the second side wall 40B on both sides in the width direction H), the third side wall 40C, and the fourth side wall 40D, as shown in FIGS. 2 to 5. Thus, the second containment chamber section 62B includes, as wall sections extended from the partition wall section 60, the first side wall 40A (specifically, portions of the first side wall 40A: more specifically, portions of the first side wall 40A on both sides in the width direction H), the second side wall 40B (specifically, portions of the second side wall 40B: more specifically, portions of the second side wall 40B on both sides in the width direction H), the third side wall 40C, and the fourth side wall 40D. The case 3 includes the third cover member 31C that is joined to the aforementioned wall sections extended from the partition wall section 60. The partition wall section 60, the aforementioned wall sections, and the third cover member 31C surround the second containment chamber 70B. The third cover member 31C is joined to the aforementioned wall sections in such a manner as to cover the space surrounded by the partition wall section 60 and the wall sections from the upper side V1.

Thus, the vehicle drive device 100 of this embodiment includes the case 3, which includes the first containment chamber 70A accommodating the first rotating electric machine 1A, the second rotating electric machine 1B, the first output member 2A, the second output member 2B, and the motive power transmission mechanism T, and the second containment chamber 70B accommodating the inverter unit 90. The case 3 includes the case body member 30 integrated with the partition wall section 60, which is a portion forming the partition walls (in this example, the first partition wall 61A, the second partition wall 61B, and the third partition wall 61C) that demarcate the first containment chamber 70A and the second containment chamber 70B), the portion (first containment chamber section 62A) that is other than the partition wall section 60 and forms at least a part of the first containment chamber 70A, and the portion (second containment chamber section 62B) that is other than the partition wall section 60 and forms at least a part of the second containment chamber 70B.

In the vehicle drive device 100 of this embodiment, the portion that forms at least a part of the first containment chamber 70A and the portion that forms at least a part of the second containment chamber 70B are also formed in the member in which the partition wall section 60 is formed. This makes it easier to keep the number of components of the case 3 smaller than in the case where these two portions are not formed in the member in which the partition wall section 60 is formed. The size of the vehicle drive device 100 can be reduced by reducing the number of components of the case 3 and thus reducing the number of joints in the case 3.

In the vehicle drive device 100 of this embodiment, one partition wall formed by the partition wall section 60 can demarcate the first containment chamber 70A and the second containment chamber 70B. In the case where the first containment chamber 70A and the second containment chamber 70B are demarcated by two or more partition walls next to each other in the wall thickness direction, gaps between the partition walls can increase the size of the vehicle drive device 100. In contrast, one partition wall can demarcate the first containment chamber 70A and the second containment chamber 70B in the vehicle drive device 100 of this embodiment, making it easier to reduce the size of the vehicle drive device 100. Further, in the case where the connection path that electrically connects the inverter unit 90 to a rotating electric machine (specifically, each of the first rotating electric machine 1A and the second rotating electric machine 1B) extends through a through-hole in the partition wall, a sealing member is usually provided to seal the gap in the through-hole. If two or more partition walls next to each other in the wall thickness direction demarcate the first containment chamber 70A and the second containment chamber 70B, each of these partition walls needs to have a through-hole. The vehicle drive device 100 of this embodiment need only have a through-hole in one partition wall, making it easier to keep the number of sealing members small.

The vehicle drive device 100 of this embodiment includes the case 3. The case 3 includes the first containment chamber 70A accommodating the first rotating electric machine 1A, the second rotating electric machine 1B, the first output member 2A, the second output member 2B, and the motive power transmission mechanism T, and the second containment chamber 70B accommodating the inverter unit 90. With the first side H1 in the width direction H referring to the side in the width direction H on which the first axis X1 is located relative to the second axis X2, and the second side H2 in the width direction H referring to the side opposite to the first side H1 in the width direction H, the second containment chamber 70B has a first section 71A, which is a section sandwiched between the first rotating electric machine 1A and the second rotating electric machine 1B in the axial direction L, and a second section 71B, which is a section on the second side H2 in the width direction H relative to the first section 71A, as shown in FIG. 3. The second section 71B of this embodiment has a larger dimension in the axial direction L than the first section 71A. In this embodiment, a part of the second section 71B overlaps the first containment chamber 70A as viewed in the width direction H (as viewed in a direction parallel to the width direction H), as shown in FIG. 8.

In the vehicle drive device 100 of this embodiment, the second section 71B is less constrained in terms of the dimension in the axial direction L than the first section 71A that is sandwiched between the first rotating electric machine 1A and the second rotating electric machine 1B in the axial direction L. The region where the second containment chamber 70B is formed as viewed in the up-down direction V can be expanded by increasing the dimension of the second section 71B in the axial direction L as mentioned above. Note that a part of the second section 71B overlaps the first containment chamber 70A as viewed in the width direction H. This can expand the region where the second containment chamber 70B is formed as viewed in the up-down direction V, while preventing an increase in the size of the vehicle drive device 100 in the up-down direction V. Further, thus expanding the region where the second containment chamber 70B is formed as viewed in the up-down direction V makes it possible to keep small the dimension of the second containment chamber 70B in the up-down direction V that is required to accommodate the inverter unit 90. Accordingly, the inverter unit 90 can be disposed in an upper part of the vehicle drive device 100 while preventing an increase in the size of the vehicle drive device 100 in the up-down direction V.

In this embodiment, a portion of the second section 71B on the first side L1 in the axial direction L (a later-described first region 72A) overlaps a portion of the first containment chamber 70A that accommodates the first rotating electric machine 1A as viewed in the width direction H. A portion of the second section 71B on the second side L2 in the axial direction L (a later-described second region 72B) overlaps a portion of the first containment chamber 70A that accommodates the second rotating electric machine 1B as viewed in the width direction H.

With the first side L1 in the axial direction L referring to the side in the axial direction L on which the first rotating electric machine 1A is disposed relative to the second rotating electric machine 1B, and the second side L2 in the axial direction L referring to the side opposite to the first side L1 in the axial direction L, the second section 71B of this embodiment has a first region 72A, which is a region extended toward the first side L1 in the axial direction L relative to the first section 71A, and a second region 72B, which is a region extended toward the second side L2 in the axial direction L relative to the first section 71A, as shown in FIG. 3. Specifically, the second section 71B has a third region 72C, which is a region extended toward the second side H2 in the width direction H relative to the first section 71A. The first region 72A is a region of the second section 71B on the first side L1 in the axial direction L relative to the third region 72C. The second region 72B is a region of the second section 71B on the second side L2 in the axial direction L relative to the third region 72C. In this embodiment, the first terminal block 91A for electrically connecting the inverter unit 90 to the first rotating electric machine 1A is disposed in the first region 72A. The second terminal block 91B for electrically connecting the inverter unit 90 to the second rotating electric machine 1B is disposed in the second region 72B.

In the vehicle drive device 100 of this embodiment, it is possible to dispose the first terminal block 91A at a position in the axial direction L at which the first terminal block 91A can be easily electrically connected to the first rotating electric machine 1A, and dispose the second terminal block 91B at a position in the axial direction L at which the second terminal block 91B can be easily electrically connected to the second rotating electric machine 1B, while giving consideration to the positional relationship in the axial direction L between the first rotating electric machine 1A and the second rotating electric machine 1B, as mentioned above. Further, in the vehicle drive device 100 of this embodiment, the first terminal block 91A and the second terminal block 91B can be disposed in such a manner as to avoid a central region (third region 72C) that is a region of the second section 71B that is extended toward the second side H2 in the width direction H relative to the first section 71A. It is thus possible to dispose constituent elements of the inverter unit 90 other than the first terminal block 91A and the second terminal block 91B, in a region continuous in the width direction H, including the first section 71A and the central area (third region 72C) of the second section 71B, thus making it easier to appropriately dispose the constituent elements of the inverter unit 90 within the second containment chamber 70B.

The first terminal block 91A and the second terminal block 91B each have inverter-side terminals 92 that are electrically connected to an inverter (inverter circuit) included in the inverter unit 90, as shown in FIGS. 2 to 4. The inverter is electrically connected to the first terminal block 91A and the second terminal block 91B within the second containment chamber 70B. The first terminal block 91A and second terminal block 91B each have a rotating electric machine-side terminal 93 that is electrically connected to the corresponding rotating electric machine, as shown in FIG. 2. The inverter-side terminals 92 and the rotating electric machine-side terminal 93 of the first terminal block 91A are electrically connected to each other. The inverter-side terminals 92 and the electric machine-side terminal 93 of the second terminal block 91B are electrically connected to each other. Although FIG. 2 only shows the second terminal block 91B, the first terminal block 91A has the same rotating electric machine-side terminal 93 as the rotating electric machine-side terminal 93 of the second terminal block 91B. The rotating electric machine-side terminal 93 of the first terminal block 91A is electrically connected to the first rotating electric machine 1A (e.g. a bus bar connected to a coil of the first stator 11A) within the first containment chamber 70A. The rotating electric machine-side terminal 93 of the second terminal block 91B is electrically connected to the second rotating electric machine 1B (e.g. a bus bar connected to a coil of the second stator 11B) within the first containment chamber 70A.

The first terminal block 91A and the second terminal block 91B extend through the partition wall (specifically, the third partition wall 61C) that demarcates the first containment chamber 70A and the second containment chamber 70B. That is, the connection path that electrically connects the inverter unit 90 to the first rotating electric machine 1A and the connection path that electrically connects the inverter unit 90 to the second rotating electric machine 1B pass through respective through-holes (see FIG. 2) in the third partition wall 61C. Although details are omitted, a through-hole through which the first terminal block 91A is inserted is provided with a sealing member that seals the gap in the through-hole, and a through-hole through which the second terminal block 91B is inserted is provided with a sealing member that seals the gap in the through-hole.

The case 3 has a first surrounding wall 41A, which is a wall surrounding the first rotating electric machine 1A, and a second surrounding wall 41B, which is a wall surrounding the second rotating electric machine 1B, as shown in FIGS. 2 to 5. In this embodiment, the first surrounding wall 41A is constituted by a portion of the case body member 30 on the first side L1 in the axial direction L, and the first cover member 31A. The second surrounding wall 41B is constituted by a portion of the case body member 30 on the second side L2 in the axial direction L, and the second cover member 31B.

The first surrounding wall 41A has a first peripheral wall section, a first wall section, and a second wall section. The first peripheral wall section is a wall section that has a cylindrical shape extending in the axial direction L and surrounds the first rotating electric machine 1A (and also surrounds the differential gear mechanism 6 in this embodiment). In this embodiment, a portion of the first peripheral wall section on the first side L1 in the axial direction L is constituted by the first cover member 31A, and a portion of the first peripheral wall section on the second side L2 in the axial direction L is constituted by the case body member 30. The first wall section is a wall section that closes an opening section of the first peripheral wall section on the first side L1 in the axial direction L. The first cover member 31A forms the first wall of this embodiment. The first wall (first cover member 31A) has a through-hole, and the first output member 2A is disposed in this through-hole. The second wall section is a wall section that closes a part of the opening section of the first peripheral wall section on the second side L2 in the axial direction L, and faces the first rotating electric machine 1A in the axial direction L, on the second side L2 in the axial direction L relative to the first rotating electric machine 1A. The case body member 30 (specifically, a portion of the case body member 30 that includes the first partition wall 61A) forms the second wall of this embodiment.

The second surrounding wall 41B has a second peripheral wall section, a third wall section, and a fourth wall section. The second peripheral wall section is a wall section that has a cylindrical shape extending in the axial direction L and surrounds the second rotating electric machine 1B (and also surrounds the oil pump 20 in this embodiment). In this embodiment, a portion of the second peripheral wall section on the second side L2 in the axial direction L is constituted by the second cover member 31B, and a portion of the second peripheral wall section on the first side L1 in the axial direction L is constituted by the case body member 30. The third wall section is a wall section that closes an opening section of the second peripheral wall section on the second side L2 in the axial direction L. The second cover member 31B forms the third wall of this embodiment. The third wall (second cover member 31B) has a through-hole, and the second output member 2B is disposed in this through-hole. The fourth wall section is a wall section that closes a part of the opening section of the second peripheral wall section on the first side L1 in the axial direction L, and faces the second rotating electric machine 1B in the axial direction L, on the first side L1 in the axial direction L relative to the second rotating electric machine 1B. The case body member 30 (specifically, a portion of the case body member 30 that includes the second partition wall 61B) forms the fourth wall of this embodiment.

The first surrounding wall 41A and the second surrounding wall 41B are spaced apart from each other in the axial direction L. Thus, a recessed section (a portion where the second containment chamber 70B is formed) is formed in a portion of the case 3 (specifically, the case body member 30) between the first surrounding wall 41A and the second surrounding wall 41B in the axial direction L. In this embodiment, a portion of the case 3 that forms at least a part of the second containment chamber 70B serves as a reinforcing rib that increases the rigidity of the recessed section. Specifically, the third side wall 40C and the fourth side wall 40D of the second containment chamber 70B join the first surrounding wall 41A to the second surrounding wall 41B in the axial direction L, and the third side wall 40C and the fourth side wall 40D (particularly, the third side wall 40C) serve as reinforcing ribs.

The case 3 of this embodiment thus includes the first surrounding wall 41A that is a wall surrounding the first rotating electric machine 1A, the second surrounding wall 41B that is a wall surrounding the second rotating electric machine 1B, and joint walls (the third side wall 40C and the fourth side wall 40D in this example) that form at least parts of the second containment chamber 70B and join the first surrounding wall 41A to the second surrounding wall 41B in the axial direction L.

In the vehicle drive device 100 of this embodiment, the joint walls (the third side wall 40C and the fourth side wall 40D in this example), which form at least parts of the second containment chamber 70B, can serve as reinforcing ribs that increase the rigidity of the recessed section in the case 3 that is formed between the first surrounding wall 41A and the second surrounding wall 41B in the axial direction L. The joint walls for forming the second containment chamber 70B can thus be used to reinforce the case 3, thereby making it easier to appropriately ensure the rigidity of the case 3.

The vehicle drive device 100 includes an oil pump 20 that supplies oil to the first rotating electric machine 1A and the second rotating electric machine 1B, and an oil cooler 22 that cools the oil, as shown in FIG. 2. For example, the oil pump 20 can be an electric oil pump driven by an electric motor. The type of the pump is not specifically limited, and may be a gear pump, a vane pump, a screw pump, or the like. The oil pump 20 of this embodiment is accommodated in the first containment chamber 70A. A configuration may alternatively be employed in which the oil pump 20 is not accommodated in the first containment chamber 70A (e.g. a configuration in which the oil pump 20 is attached to the outside of the case 3).

Figure 6:
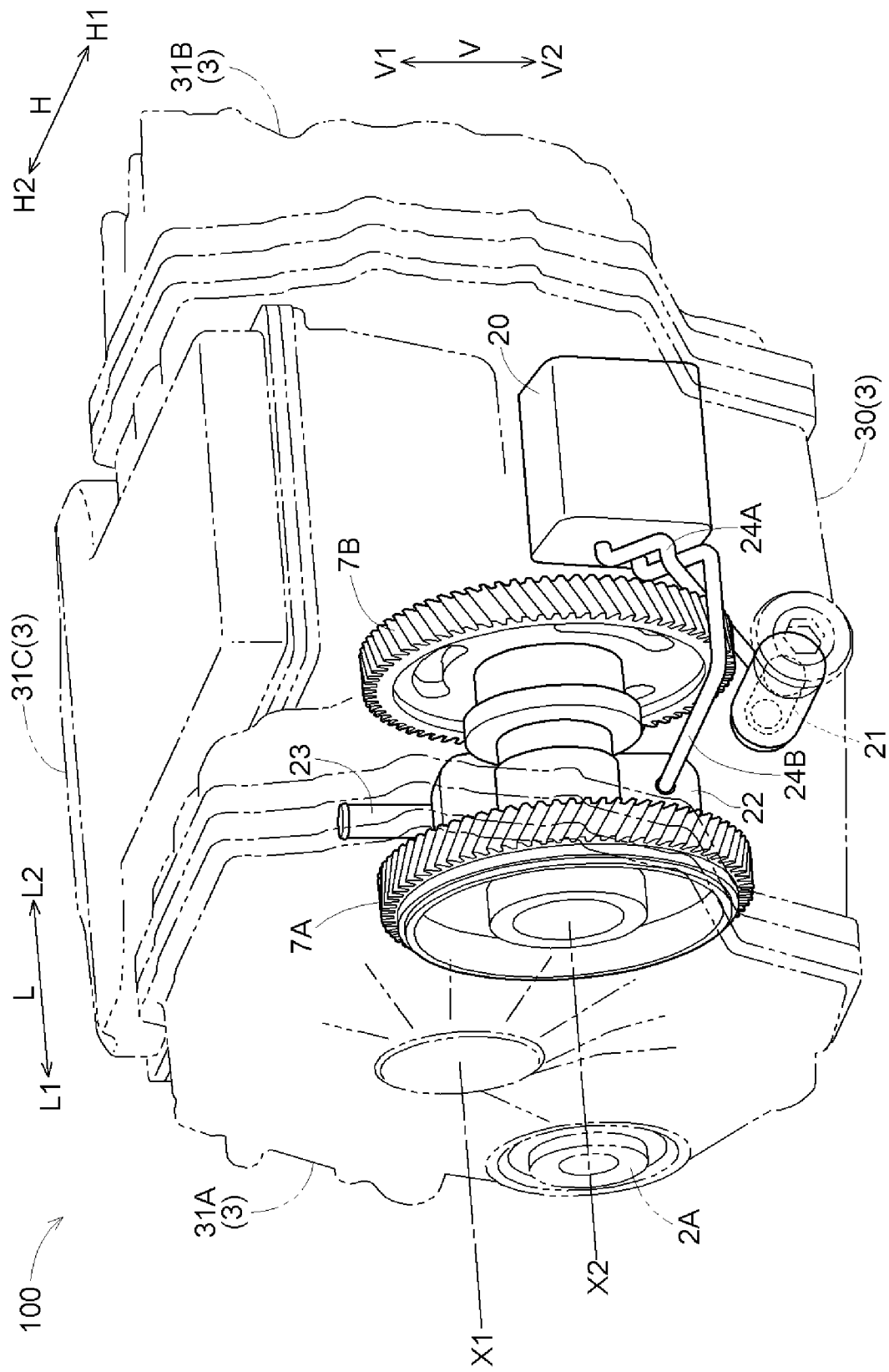

The oil pump 20 (specifically, an inlet of the oil pump 20) is connected, via a first oil passage 24A, to a strainer 21, which is a filter that removes foreign matter from the oil, as shown in FIG. 6. The oil pump 20 suctions oil stored in the case 3 through the strainer 21. The oil pump 20 (specifically, an outlet of the oil pump 20) is connected to the oil cooler 22 via a second oil passage 24B. The oil discharged from the oil pump 20 extends through the oil cooler 22 and is thereafter supplied to the first rotating electric machine 1A and the second rotating electric machine 1B. The first oil passage 24A and the second oil passage 24B are formed with oil pipes, for example.

The oil cooler 22 cools oil by means of heat exchange between the oil and a coolant (e.g. cooling water, air etc.). The oil cooler 22 of this embodiment is a water-cooling oil cooler that uses cooling water as a coolant. The oil cooler 22 is connected to a pipe member 23 for introducing the cooling water into the oil cooler 22, and a pipe member 23 for discharging the cooling water from the oil cooler 22, as shown in FIGS. 2 to 4.

Figure 7:
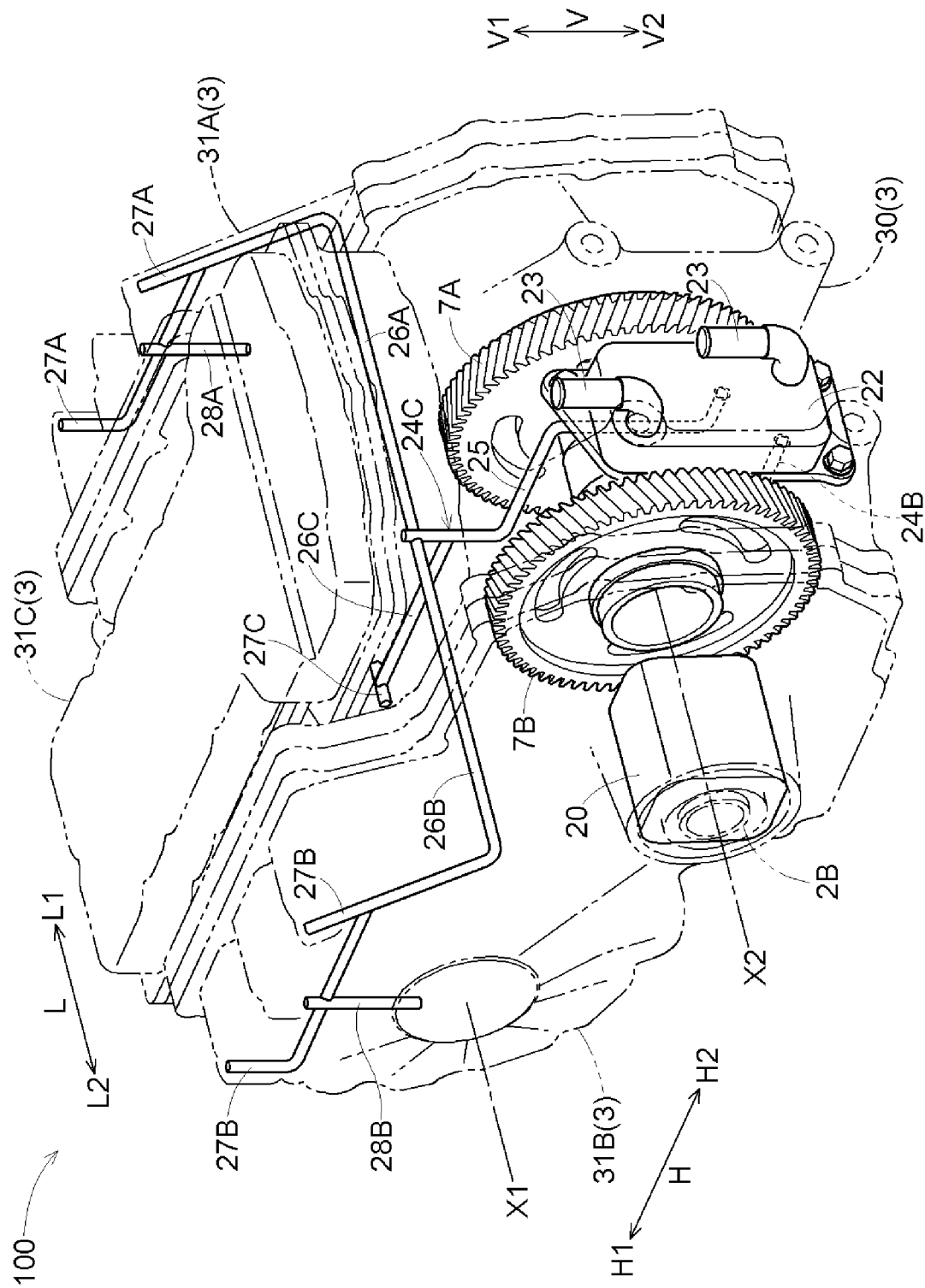

Here, a "first outer gear" refers to a gear disposed on the outermost side R2 in the radial direction R (radial direction based on the second axis X2) among gears disposed on the second axis X2 and constituting the first transmission system T1 (i.e. a gear with the largest diameter). A "second outer gear" refers to a gear disposed on the outermost side R2 in the radial direction R among gears disposed on the second axis X2 and constituting the second transmission system T2. In this embodiment, the first differential input gear 7A is the first outer gear, and the second differential input gear 7B is the second outer gear, as shown in FIGS. 1 and 2. The first differential input gear 7A and the second differential input gear 7B are spaced apart from each other in the axial direction L. The oil cooler 22 is disposed between the first differential input gear 7A and the second differential input gear 7B in the axial direction L in such a manner as to overlap at least either the first differential input gear 7A or the second differential input gear 7B as viewed in the axial direction L, as shown in FIGS. 2, 5, and 7.

In the vehicle drive device 100, the first differential input gear 7A and the second differential input gear 7B are spaced apart from each other in the axial direction L. Thus, a region between the first differential input gear 7A and the second differential input gear 7B in the axial direction L that overlaps at least either the first differential input gear 7A or the second differential input gear 7B as viewed in the axial direction L is likely to be a dead space. In the vehicle drive device 100, in which the oil cooler 22 is disposed as described above, the oil cooler 22 can be disposed using the region that is likely to be a dead space, thus making it possible to prevent an increase in the size of the vehicle drive device 100 due to disposing the oil cooler 22.

In this embodiment, the oil cooler 22 is disposed on the second side H2 in the width direction H relative to the second axis X2 and between the first differential input gear 7A and the second differential input gear 7B in the axial direction L, in such a manner as to overlap at least either the first differential input gear 7A or the second differential input gear 7B as viewed in the axial direction L, as shown in FIG. 5. In this embodiment, the first differential input gear 7A has the same diameter as the second differential input gear 7B, and the oil cooler 22 overlaps both the first differential input gear 7A and the second differential input gear 7B as viewed in the axial direction L.

The case 3 has the peripheral wall section 42 that covers the outer side R2, in the radial direction R, of the first differential input gear 7A and the second differential input gear 7B, as shown in FIGS. 2 to 4. The peripheral wall section 42 of this embodiment is constituted by the case body member 30 (specifically, the first containment chamber section 62A and the third partition wall 61C). The peripheral wall section 42 has a recessed section 43 that is recessed toward the inner side R1 in the radial direction R in an area corresponding to the space between the first differential input gear 7A and the second differential input gear 7B in the axial direction L. The recessed section 43 of this embodiment is recessed toward the first side H1 in the width direction H in an area of the peripheral wall section 42 on the second side H2 in the width direction H. At least a part of the oil cooler 22 is located within the recessed section 43. That is, the oil cooler 22 is attached to the outside of the case 3 such that at least a part of the oil cooler 22 is located within the recessed section 43. Here, "being located within the recessed section 43" means being covered by the peripheral wall section 42 as viewed in the axial direction L, regardless of which side in the axial direction L the oil cooler 22 is viewed from. In this embodiment, the entire body (where heat exchange between the oil and the coolant takes place) of the oil cooler 22 is located within the recessed section 43.

As described above, the vehicle drive device 100 of this embodiment includes the case 3 that accommodates the first rotating electric machine 1A, the second rotating electric machine 1B, the first output member 2A, the second output member 2B, and the motive power transmission mechanism T. The case 3 has the peripheral wall section 42 that covers the outer side R2, in the radial direction R, of the first differential input gear 7A and the second differential input gear 7B. The recessed section 43, which is recessed toward the inner side R1 in the radial direction R, is formed in an area that is a part of the peripheral wall section 42 and corresponds to a space between the first differential input gear 7A and the second differential input gear 7B in the axial direction L. At least a part of the oil cooler 22 is located within the recessed section 43.

The oil cooler 22 is often attached to the outside of the case 3. In this case, the shape of the vehicle drive device 100 is likely to be such that a portion to which the oil cooler 22 is attached protrudes outward relative to the surrounding area, and the vehicle drive device 100 can become larger on the side on which the oil cooler 22 is attached. In the vehicle drive device 100 of this embodiment, the recessed section 43 is formed in the peripheral wall section 42 of the case 3 with use of the region between the first differential input gear 7A and the second differential input gear 7B in the axial direction L that is likely to be a dead space, and the oil cooler 22 can be disposed in such a manner that at least a part of the oil cooler 22 is located within the recessed section 43. Thus, the oil cooler 22 can be attached to the outside of the case 3 while preventing an increase in the size of the vehicle drive device 100.

In this the embodiment, the first disposal region A1, which is the disposal region of the first rotating electric machine 1A in the axial direction L, overlaps a third disposal region A3, which is a disposal region of the differential gear mechanism 6 in the axial direction L, as shown in FIG. 2. The third disposal region A3 in FIG. 2 is the disposal region the carrier C6 of the differential gear mechanism 6 in the axial direction L (the region between an edge of the carrier C6 on the first side L1 in the axial direction L and an edge thereof on the second side L2 in the axial direction L, in the axial direction L). Further, in this the embodiment, the second disposal region A2, which is the disposal region of the second rotating electric machine 1B in the axial direction L, overlaps a fourth disposal region A4, which is a disposal region of the oil pump 20 in the axial direction L. The oil cooler 22 of this embodiment overlaps at least either the differential gear mechanism 6 or the oil pump 20 as viewed in the axial direction L. The oil cooler 22 in this example overlaps the differential gear mechanism 6 and not overlap the oil pump 20 as viewed in the axial direction L (the oil pump 20 is omitted in FIG. 5), as shown in FIG. 5. However, it is also possible to alternatively employ a configuration in which the oil cooler 22 overlaps the oil pump 20 and not overlap the differential gear mechanism 6 as viewed in the axial direction L, or a configuration in which the oil cooler 22 overlaps both the differential gear mechanism 6 and the oil pump 20 as viewed in the axial direction L.

In this embodiment, the first driving force source (the driving force source that outputs torque transmitted by the first transmission system T1) is the first rotating electric machine 1A that includes the first rotor 12A, and the second driving force source (the driving force source that outputs torque transmitted by the second transmission system T2) is the second rotating electric machine 1B that includes the second rotor 12B, as described above. The first transmission system T1 includes the first input gear 4A that is coupled to the first rotor 12A in an integrally rotatable manner, and the first counter gear mechanism 5A that includes the third gear meshing with the first gear and the fourth gear that integrally rotates with the third gear. The second transmission system T2 includes the second input gear 4B that is coupled to the second rotor 12B in an integrally rotatable manner, and the second counter gear mechanism 5B that includes the fifth gear meshing with the second gear and the sixth gear that integrally rotates with the fifth gear. The first differential input gear 7A is a gear meshing with the first counter output gear 52A, and the second differential input gear 7B is a gear meshing with the second counter output gear 52B. The motive power transmission mechanism T has the differential gear mechanism 6, which distributes torque of the first rotating electric machine 1A transmitted to the first differential input gear 7A and torque of the second rotating electric machine 1B transmitted to the second differential input gear 7B, to the first output member 2A and the second output member 2B. The disposal regions of the first rotating electric machine 1A and the differential gear mechanism 6 in the axial direction L overlap each other, and the disposal regions of the second rotating electric machine 1B and the oil pump 20 in the axial direction L overlap each other. The oil cooler 22 overlaps at least either the differential gear mechanism 6 or the oil pump 20 as viewed in the axial direction L.

In the case where the first transmission system T1 and the second transmission system T2 are configured as described above, the diameters of the first differential input gear 7A and the second differential input gear 7B are likely to increase if the reduction ratio from the rotating electric machines to the first output member 2A and the second output member 2B is to be kept large. In the vehicle drive device 100 of this embodiment, the oil cooler 22 can be disposed with use of the region between the first differential input gear 7A and the second differential input gear 7B in the axial direction L that is likely to be a dead space, as described above. Therefore, even if the diameters of the first differential input gear 7A and the second differential input gear 7B are large, a further increase in the size of the vehicle drive device 100 due to disposing the oil cooler 22 can be prevented.

Furthermore, in the vehicle drive device 100 of this embodiment, the disposal regions of the first rotating electric machine 1A and the differential gear mechanism 6 in the axial direction L overlap each other, and the disposal regions of the second rotating electric machine 1B and the oil pump 20 in the axial direction L overlap each other. Thus separating the differential gear mechanism 6 and the oil pump 20 on the respective sides in the axial direction L can prevent an increase in the size of the vehicle drive device 100 on one side in the axial direction L than on the other side, and allows the vehicle drive device 100 to have a shape that can be easily mounted in a vehicle. Further, in the vehicle drive device 100 of this embodiment, the oil cooler 22 overlaps at least either the differential gear mechanism 6 or the oil pump 20 as viewed in the axial direction L, making it easier to keep small the dimension of the vehicle drive device 100 as viewed in the axial direction L.

In this the embodiment, the second oil passage 24B, which is an oil passage connecting the oil pump 20 to the oil cooler 22, extends through a region between the first differential input gear 7A and the second differential input gear 7B in the axial direction L and overlaps at least either (both in the example shown in FIG. 6) the first differential input gear 7A or the second differential input gear 7B as viewed in the axial direction L, as shown in FIG. 6.

In the vehicle drive device 100 of this embodiment, the second oil passage 24B, which is an oil passage connecting the oil pump 20 to the oil cooler 22, is disposed as described above, thereby allowing the oil passage connecting the oil pump 20 to the oil cooler 22 to be also disposed with use of the region between the first differential input gear 7A and the second differential input gear 7B in the axial direction L that is likely to be a dead space. This makes it easy to reduce the size of the vehicle drive device 100.

The second oil passage 24B of this the embodiment extends through the region on the lower side V2 relative to the second axis X2 and between the first differential input gear 7A and the second differential input gear 7B in the axial direction L, the region overlapping at least either the first differential input gear 7A or the second differential input gear 7B as viewed in the axial direction L, as shown in FIG. 6. Meanwhile, a later-described third oil passage 24C of this embodiment extends through a region on the upper side V1 relative to the second axis X2 and between the first differential input gear 7A and the second differential input gear 7B in the axial direction L, the region overlapping at least either the first differential input gear 7A or the second differential input gear 7B as viewed in the axial direction L, as shown in FIG. 7.

In this the embodiment, the third oil passage 24C, which is an oil passage connecting the oil cooler 22 to both the first rotating electric machine 1A and the second rotating electric machine 1B, extends through a region between the first differential input gear 7A and the second differential input gear 7B in the axial direction L, the region overlapping at least either (both in the example shown in FIG. 7) the first differential input gear 7A or the second differential input gear 7B as viewed in the axial direction L, as shown in FIG. 7.

In the vehicle drive device 100 of this the embodiment, the third oil passage 24C, which is an oil passage connecting the oil cooler 22 to both the first rotating electric machine 1A and the second rotating electric machine 1B, is disposed as described above. Thus, the oil passage connecting the oil cooler 22 to both the first rotating electric machine 1A and the second rotating electric machine 1B can also be disposed with use of the region between the first differential input gear 7A and the second differential input gear 7B in the axial direction L that is likely to be a dead space. This makes it easy to reduce the size of the vehicle drive device 100. Disposing the third oil passage 24C as described above allows the oil passage connecting the oil cooler 22 to both the first rotating electric machine 1A and the second rotating electric machine 1B to be branched off from between the first rotating electric machine 1A and the second rotating electric machine 1B in the axial direction L (e.g. from a middle portion between the first rotating electric machine 1A and the second rotating electric machine 1B in the axial direction L) to both sides in the axial direction L and reach the first rotating electric machine 1A and the second rotating electric machine 1B. This makes it easy to make the length of the oil passage connecting the oil cooler 22 to the first rotating electric machine 1A close to the length of the oil passage connecting the oil cooler 22 to the second rotating electric machine 1B, and to equalize the pressure drop in these two oil passages. For example, the pressure drop in these two oil passages can be reduced to the same degree by keeping the lengths of the oil passages short to the same degree.

The following is a specific description of a configuration of the third oil passage 24C in the vehicle drive device 100 of this embodiment. The third oil passage 24C includes a common oil passage 25, a first branch oil passage 26A, a second branch oil passage 26B, a third branch oil passage 26C, first cooling oil passages 27A, a second cooling oil passages 27B, a third cooling oil passage 27C, a first lubricating oil passage 28A, and a second lubricating oil passage 28B, each of which will be described below. Each of these the oil passages included in the third oil passage 24C is formed with an oil pipe or in a wall of the case 3, for example.

An upstream end of the common oil passage 25 is connected to the oil cooler 22, as shown in FIG. 7. The common oil passage 25 extends through a region between the first differential input gear 7A and the second differential input gear 7B in the axial direction L that overlaps at least either (both in the example shown in FIG. 7) the first differential input gear 7A or the second differential input gear 7B as viewed in the axial direction L. The common oil passage 25 is disposed in a middle area between the first rotating electric machine 1A and the second rotating electric machine 1B in the axial direction L, for example.

The first branch oil passage 26A, the second branch oil passage 26B, and the third branch oil passage 26C are connected, in parallel, to a downstream portion of the common oil passage 25. The oil discharged from the oil cooler 22 to the common oil passage 25 is supplied to the first branch oil passage 26A, the second branch oil passage 26B, and the third branch oil passage 26C through the common oil passage 25. The first branch oil passage 26A extends from a connecting section with the common oil passage 25 toward the first side L1 in the axial direction L. The second branch oil passage 26B extends from a connecting section with the common oil passage 25 toward the second side L2 in the axial direction L. The third branch oil passage 26C extends from a connecting section with the common oil passage 25 toward the first side H1 in the width direction H. Thus, the third oil passage 24C branches from the common oil passage 25 toward both sides in the axial direction L and the first side H1 in the width direction H.

The oil supplied from the common oil passage 25 to the first branch oil passage 26A is supplied to the first rotating electric machine 1A. Specifically, the first cooling oil passages 27A and the first lubricating oil passage 28A are connected, in parallel, to a downstream portion of the first branch oil passage 26A, and the oil from the first branch oil passage 26A is supplied to the first cooling oil passages 27A and the first lubricating oil passage 28A. The oil from the first cooling oil passages 27A is then supplied to the first rotating electric machine 1A and cools the first rotating electric machine 1A. Also, the oil from the first lubricating oil passage 28A is supplied to parts that require lubrication, such as bearings supporting the first rotor shaft 13A, and lubricates these parts.

In this the embodiment, oil supply sections 97 for supplying oil to the first rotating electric machine 1A are located on the upper side V1 relative to the first rotating electric machine 1A, as shown in FIG. 5. The oil supply sections 97 supply oil supplied from the first cooling oil passages 27A to the first rotating electric machine 1A. The oil supply sections 97 in the example shown in FIG. 5 are supply pipes extending in the axial direction L, and supply oil in the supply pipe to the first rotating electric machine 1A (specifically, the first stator 11A) through holes formed in the supply pipes (not shown). The oil from the first cooling oil passages 27A is thus supplied to the first rotating electric machine 1A via the oil supply sections 97. In the example shown in FIG. 5, two oil supply sections 97 are located on both sides in the width direction H with the first axis X1 therebetween, and correspondingly, two first cooling oil passage 27A are connected to the respective first branch oil passage 26A (see FIG. 7).

The oil supplied from the common oil passage 25 to the second branch oil passage 26B is supplied to the second rotating electric machine 1B. Specifically, the second cooling oil passages 27B and the second lubricating oil passage 28B are connected, in parallel, to a downstream portion of the second branch oil passage 26B, and the oil from the second branch oil passage 26B is supplied to the second cooling oil passages 27B and the second lubricating oil passage 28B. The oil from the second cooling oil passages 27B is then supplied to the second rotating electric machine 1B and cools the second rotating electric machine 1B. Also, the oil from the second lubricating oil passage 28B is supplied to parts that require lubrication, such as bearings supporting the second rotor shaft 13B, and lubricates these parts. Although details are omitted, the same oil supply sections as the oil supply sections 97 shown in FIG. 5 are located on the upper side V1 relative to the second rotating electric machine 1B in this the embodiment, and the oil from the second cooling oil passages 27B is supplied to the second rotating electric machine 1B via these oil supply sections.

The oil supplied from the common oil passage 25 to the third branch oil passage 26C is supplied to both the first rotating electric machine 1A and the second rotating electric machine 1B. Specifically, the third cooling oil passage 27C, which is supplied with the oil from the third branch oil passage 26C, is located between the first rotating electric machine 1A and the second rotating electric machine 1B in the axial direction L on the first axis X1 (in this example, in a middle area between the first rotating electric machine 1A and the second rotating electric machine 1B in the axial direction L), as shown in FIG. 2. In the example shown in FIG. 2, a connecting section between the third branch oil passage 26C and the third cooling oil passage 27C is formed in the supporter 44. The oil from the third cooling oil passage 27C is supplied to the first rotating electric machine 1A and the second rotating electric machine 1B, and cools the first rotating electric machine 1A and the second rotating electric machine 1B.

An end of the third cooling oil passage 27C on the first side L1 in the axial direction L is connected to the interior of the first rotor shaft 13A, which is hollow, and an end of the third cooling oil passage 27C on the second side L2 in the axial direction L is connected to the interior of the second rotor shaft 13B, which is hollow. Thus, the oil supplied from the third branch oil passage 26C to the third cooling oil passage 27C branches off toward both sides in the axial direction L and is supplied into the first rotor shaft 13A and the second rotor shaft 13B. The oil supplied from the third cooling oil passage 27C to the inside of the first rotor shaft 13A is supplied to the first rotating electric machine 1A, and cools the first rotating electric machine 1A. For example, heat exchange between the oil in the first rotor shaft 13A and the first rotor shaft 13A cools the first rotor 12A fixed to the first rotor shaft 13A. Also, for example, the oil discharged from a hole in the first rotor shaft 13A is supplied to the coil end section 15 of the first stator 11A, and cools the coil end section 15. The oil supplied from the third cooling oil passage 27C to the inside of the second rotor shaft 13B is supplied to the second rotating electric machine 1B, and cools the second rotating electric machine 1B. For example, heat exchange between the oil in the second rotor shaft 13B and the second rotor shaft 13B cools the second rotor 12B fixed to the second rotor shaft 13B. Also, for example, the oil discharged from a hole in the second rotor shaft 13B is supplied to the coil end section 15 of the second stator 11B, and cools the coil end section 15.

Other Embodiments

Next, other embodiments of the vehicle drive device will be described.

(1) The above embodiment has described an example of a configuration in which the first terminal block 91A is disposed in the first region 72A, and the second terminal block 91B is disposed in the second region 72B. However, the present disclosure is not limited to this type of configuration, and a configuration may alternatively be employed in which one or both of the first terminal block 91A and the second terminal block 91B are disposed in the third region 72C of the second section 71B, or one or both of the first terminal block 91A and the second terminal block 91B are disposed in the first section 71A.

(2) The above embodiment has described an example of a configuration in which the second section 71B has a dimension in the axial direction L larger than the first section 71A, and a part of the second section 71B overlaps the first containment chamber 70A as viewed in the width direction H. However, the present disclosure is not limited to this type of configuration, and a configuration may alternatively be employed in which the dimension of the second section 71B in the axial direction L is equal to the dimension of the first section 71A in the axial direction L, and the second section 71B does not have a portion overlapping the first containment chamber 70A as viewed in the width direction H. That is, a configuration in which the second section 71B does not have the first region 72A and the second region 72B may alternatively be employed.

(3) The above embodiment has described an example of a configuration in which the recessed section 43 is formed in an area that is a part of the peripheral wall section 42 that corresponds to the space between the first outer gear (first differential input gear 7A in the above embodiment) and the second outer gear (second differential input gear 7B in the above embodiment) in the axial direction L, and at least a part of the oil cooler 22 is located within the recessed section 43. However, the present disclosure is not limited to the configuration where the oil cooler 22 is attached to the outside of the case 3, and the oil cooler 22 may alternatively be accommodated in the first containment chamber 70A.

(4) The above embodiment has described an example of a configuration in which the disposal regions of the first rotating electric machine 1A and the differential gear mechanism 6 in the axial direction L overlap each other, and the disposal regions of the second rotating electric machine 1B and the oil pump 20 in the axial direction L overlap each other. However, the present disclosure is not limited to this type of configuration. Alternatively, it is possible to alternatively employ a configuration in which the disposal regions of the first rotating electric machine 1A and the differential gear mechanism 6 in the axial direction L do not overlap each other, or a configuration in which the disposal regions of the second rotating electric machine 1B and the oil pump 20 in the axial direction L do not overlap each other, or a combination of these configurations. It is also possible to alternatively employ a configuration in which the disposal regions of the first rotating electric machine 1A and the oil pump 20 in the axial direction L overlap each other, and the disposal regions of the second rotating electric machine 1B and the differential gear mechanism 6 in the axial direction L overlap each other.

(5) The above embodiment has described an example of a configuration in which the oil cooler 22 overlaps at least either the differential gear mechanism 6 or the oil pump 20 as viewed in the axial direction L. However, the present disclosure is not limited to this type of configuration, and a configuration may alternatively be employed in which the oil cooler 22 is disposed in such a manner as to not overlap either the differential gear mechanism 6 or the oil pump 20 as viewed in the axial direction L.

(6) The above embodiment has described an example of a configuration in which the second oil passage 24B, which is an oil passage connecting the oil pump 20 to the oil cooler 22, extends through a region between the first outer gear (the first differential input gear 7A in the above embodiment) and the second outer gear (the second differential input gear 7B in the above embodiment) in the axial direction L, the region overlapping at least either the first outer gear or the second outer gear as viewed in the axial direction L. However, the present disclosure is not limited to this type of configuration, and a configuration in which the second oil passage 24B does not pass through the aforementioned region may alternatively be employed.

(7) The above embodiment has described an example of a configuration in which the third oil passage 24C, which is an oil passage connecting the oil cooler 22 to both the first rotating electric machine 1A and the second rotating electric machine 1B, extends through a region between the first outer gear (the first differential input gear 7A in the above embodiment) and the second outer gear (the second differential input gear 7B in the above embodiment) in the axial direction L, the region overlapping at least either the first outer gear or the second outer gear as viewed in the axial direction L. However, the present disclosure is not limited to this type of configuration, and a configuration in which the third oil passage 24C does not pass through the above region may alternatively be employed.

(8) The above embodiment has described an example of a configuration in which the first outer gear (the first differential input gear 7A in the above embodiment) has the same diameter as the second outer gear (the second differential input gear 7B in the above embodiment). However, the present disclosure is not limited to this type of configuration, and the first outer gear may have a diameter larger or smaller than the second outer gear. In this case, the oil cooler 22 may be disposed between the first outer gear and the second outer gear in the axial direction L in such a manner as to overlap only either the first outer gear or the second outer gear as viewed in the axial direction L, unlike the above embodiment. Further, in this case, one or both of the second oil passage 24B and the third oil passage 24C may pass through a region between the first outer gear and the second outer gear in the axial direction L that overlaps only either the first outer gear or the second outer gear as viewed in the axial direction L, unlike the above embodiment.

(9) The above embodiment has described an example of a configuration in which the differential gear mechanism 6 is a planetary gear system that includes four rotating elements. However, the present disclosure is not limited to this type of configuration. For example, the differential gear mechanism 6 may be a mechanism obtained by joining two planetary gear mechanisms to have four rotating elements in total that integrally perform differential operation.

(10) The above embodiment has described an example of a configuration in which the first transmission system T1 includes the first counter gear mechanism 5A, and the second transmission system T2 includes the second counter gear mechanism 5B. However, the present disclosure is not limited to this type of configuration, and a configuration may alternatively be employed in which the first transmission system T1 does not include the first counter gear mechanism 5A, and the second transmission system T2 does not include the second counter gear mechanism 5B. For example, a configuration may be employed in which an idler gear meshing with both the first input gear 4A and the first differential input gear 7A is provided instead of the first counter gear mechanism 5A, and an idler gear meshing with both the second input gear 4B and the second differential input gear 7B is provided instead of the second counter gear mechanism 5B. Alternatively, a configuration may be employed in which the first differential input gear 7A meshes with the first input gear 4A, and the second differential input gear 7B meshes with the second input gear 4B.

Figure 9:
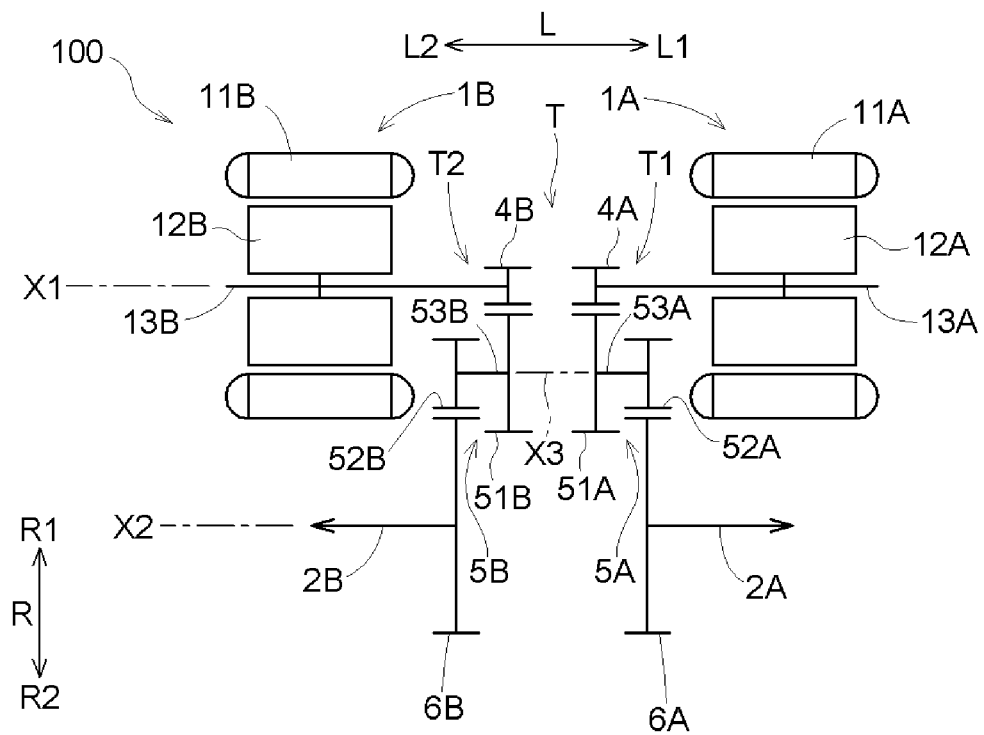
FIG. 9 is a single line diagram of a vehicle drive device according to another embodiment.

(11) The above embodiment has described an example of a configuration in which the first transmission system T1 transmits torque of the first rotating electric machine 1A to both the first output member 2A and the second output member 2B, and the second transmission system T2 transmits torque of the second rotating electric machine 1B to both the first output member 2A and the second output member 2B. However, the present disclosure is not limited to this type of configuration, and a configuration may alternatively be employed in which the first transmission system T1 transmits torque of the first rotating electric machine 1A only to the first output member 2A, and the second transmission system T2 transmits torque of the second rotating electric machine 1B only to the second output member 2B. That is, a configuration in which the motive power transmission mechanism T does not include the differential gear mechanism 6 may be employed. FIG. 9 shows an example of this type of configuration.

In the example shown in FIG. 9, the first transmission system T1 includes a first output gear 6A that integrally rotates with the first output member 2A as a gear that is disposed on the second axis X2 and to which the rotation of the first rotating electric machine 1A is input. The second transmission system T2 includes a second output gear 6B that integrally rotates with the second output member 2B as a gear that is disposed on the second axis X2 and to which the rotation of the second rotating electric machine 1B is input. The first output gear 6A meshes with the first counter output gear 52A, and the second output gear 6B meshes with the second counter output gear 52B. In the example shown in FIG. 9, the first output gear 6A is the first outer gear, and the second output gear 6B is the second outer gear.

(12) The above embodiment has described an example of a configuration in which the oil cooler 22 is disposed between the first outer gear (first differential input gear 7A in the above embodiment) and the second outer gear (second differential input gear 7B in the above embodiment) in the axial direction L in such a manner as to overlap at least either the first outer gear or the second outer gear as viewed in the axial direction L. However, the present disclosure is not limited to this type of configuration. For example, the oil cooler 22 may alternatively be disposed in such a manner as to not overlap either the first outer gear or the second outer gear as viewed in the axial direction L.

(13) The above embodiment has described an example of a configuration in which the vehicle drive device 100 includes the oil pump 20 and the oil cooler 22. However, the present disclosure is not limited to this type of configuration, and a configuration in which the vehicle drive device 100 does not include one or both of the oil pump 20 and the oil cooler 22 may alternatively be employed.

(14) The above embodiment has described an example of a configuration in which the inverter unit 90 is disposed on the upper side V1 relative to the second axis X2 in such a manner as to overlap at least some of the members disposed on the second axis X2 as viewed in the up-down direction V. However, the present disclosure is not limited to this type of configuration, and a configuration in which the inverter unit 90 does not overlap any member disposed on the second axis X2 as viewed in the up-down direction V may alternatively be employed.

(15) Note that the configurations disclosed in each of the above embodiments can also be applied in combination with configurations disclosed in other embodiments (including combinations of the configurations described as other embodiments), as long as no contradictions arise. Regarding other configurations as well, the embodiments disclosed herein is merely illustrative in all respects. Therefore, various modifications may be made as appropriate within the scope without deviating from the purpose of the present disclosure.

Summary of the Above Embodiment

The summary of the above vehicle drive device will be described below.

A vehicle drive device (100) comprises: a first rotating electric machine (1A); a second rotating electric machine (1B); a first output member (2A) drivably coupled to a first wheel (W1); a second output member (2B) drivably coupled to a second wheel (W2); a motive power transmission mechanism (T); an inverter unit (90) configured to drive the first rotating electric machine (1A) and the second rotating electric machine (1B); and a case (3), the motive power transmission mechanism (T) including: a first transmission system (T1) configured to transmit torque of the first rotating electric machine (1A) to at least the first output member (2A); and a second transmission system (T2) configured to transmit torque of the second rotating electric machine (1B) to at least the second output member (2B), the first rotating electric machine (1A) and the second rotating electric machine (1B) being disposed on a first axis (X1), the first output member (2A) and the second output member (2B) being disposed on a second axis (X2) different from the first axis (X1), which is located on an upper side (V1) relative to the second axis (X2), the first rotating electric machine (1A) and the second rotating electric machine (1B) being spaced apart from each other in an axial direction (L) parallel to the first axis (X1) and the second axis (X2), the inverter unit (90) being disposed between the first rotating electric machine (1A) and the second rotating electric machine (1B) in the axial direction (L) in such a manner as to overlap the first rotating electric machine (1A) and the second rotating electric machine (1B) as viewed in the axial direction (L), the case (3) including: a first containment chamber (70A) accommodating the first rotating electric machine (1A), the second rotating electric machine (1B), the first output member (2A), the second output member (2B), and the motive power transmission mechanism (T); a second containment chamber (70B) accommodating the inverter unit (90); and a case body member (30) having, in an integrated manner: a partition wall section (60) being a section serving as a partition wall (61A, 61B, 61C) demarcating the first containment chamber (70A) and the second containment chamber (70B): a section (62A) being other than the partition wall section (60) and serving as at least a portion of the first containment chamber (70A); and a second containment chamber section (62B) being a section other than the partition wall section (60) and serving as at least a portion of the second containment chamber (70B).

According to this configuration, the member that includes the partition wall section (60) also includes the section (62A) serving as at least a portion of the first containment chamber (70A) and the section (62B) serving as at least a portion of the second containment chamber (70B). This makes it easier to reduce the number of components of the case (3) that accommodates the first rotating electric machine (1A), the second rotating electric machine (1B), the motive power transmission mechanism (T), and the inverter unit (90) compared to the case where the member that includes the partition wall section (60) does not include these two sections (62A, 62B). It is also possible to reduce the number of joints in the case (3) and reduce the size of the vehicle drive device (100) by reducing the number of components of the case (3).

This configuration also has the following advantages. That is, when the first rotating electric machine (1A) and the second rotating electric machine (1B) are spaced apart from each other in the axial direction (L) on the same axis as described above, the region between the first rotating electric machine (1A) and the second rotating electric machine (1B) in the axial direction (L) that overlaps the first rotating electric machine (1A) and the second rotating electric machine (1B) as viewed in the axial direction (L) is likely to be a dead space. According to this configuration, the inverter unit (90) can be disposed with use of the region that is thus likely to be a dead space, thereby preventing an increase in the size of the vehicle drive device (100) due to disposing the inverter unit (90).

Here, it is preferable that the second containment chamber section (62B) includes a wall section (40A, 40B, 40C, 40D) extended from the partition wall section (60), the case (3) includes a cover member (31C) joined to the wall section (40A, 40B, 40C, 40D), and the partition wall section (60), the wall section (40A, 40B, 40C, 40D), and the cover member (31C) surround the second containment chamber (70B).

According to this structure, the case body member (30) and the cover member (31C) can appropriately form the second containment chamber (70B).

Here, it is preferable that the first axis (X1) is located on one side in a width direction (H) relative to the second axis (X2), the width direction (H) being orthogonal to the axial direction (L) as viewed in an up-down direction (V) with the vehicle drive device (100) being mounted in a vehicle, and the inverter unit (90) is disposed on the upper side (V1) relative to the second axis (X2) in such a manner as to overlap at least one member disposed on the second axis (X2) as viewed in the up-down direction (V).

According to this configuration, a wider disposal region of the inverter unit (90) as viewed in the up-down direction (V) can be ensured by using, as the disposal region of the inverter unit (90), the region on the upper side (V1) relative to the second axis (X2) in addition to the region between the first rotating electric machine (1A) and the second rotating electric machine (1B) in the axial direction (L). This makes it easier to keep small the dimension of the disposal region of the inverter unit (90) in the up-down direction (V). The inverter unit (90) can thus be disposed in an upper part of the vehicle drive device (100) while preventing an increase in the size of the vehicle drive device (100) in the up-down direction (V).

Here, it is preferable that the second containment chamber (70B) includes: a first section (71A) sandwiched between the first rotating electric machine (1A) and the second rotating electric machine (1B) in the axial direction (L); and a second section (71B) on a second side (H2) in the width direction (H) relative to the first section (71A), the second side (H2) in the width direction (H) being a side opposite to a first side (H1) in the width direction (H) on which the first axis (X1) is located relative to the second axis (X2) in the width direction (H), the second section (71B) has a larger dimension in the axial direction (L) than the first section (71A), and the second section (71B) has a portion overlapping the first containment chamber (70A) as viewed in the width direction (H).

According to this configuration, the region in which the second containment chamber (70B) is formed as viewed in the up-down direction can be expanded by increasing the dimension, in the axial direction (L), of the second section (71B) that is less constrained in terms of the dimension in the axial direction (L) than the first section (71A) that is sandwiched between the first rotating electric machine (1A) and the second rotating electric machine (1B) in the axial direction (L). Note that a part of the second section (71B) overlaps the first containment chamber (70A) as viewed in the width direction (H). This can expand the region where the second containment chamber (70B) is formed as viewed in the up-down direction (V), while preventing an increase in the size of the vehicle drive device (100) in the up-down direction (V). Further, thus expanding the region where the second containment chamber (70B) is formed as viewed in the up-down direction (V) makes it possible to keep small the dimension of the second containment chamber (70B) in the up-down direction (V) that is required to accommodate the inverter unit (90). Accordingly, the inverter unit (90) can be disposed in an upper part of the vehicle drive device (100) while preventing an increase in the size of the vehicle drive device (100) in the up-down direction (V).

Here, it is preferable that the second section (71B) includes: a first region (72A) extended from the first section (71A) toward a first side (L1) in the axial direction (L); and a second region (72B) extended from the first section (71A) toward a second side (L2) in the axial direction (L), the first side (L1) in the axial direction (L) being a side on which the first rotating electric machine (1A) is disposed relative to the second rotating electric machine (1B) in the axial direction (L), the second side (L2) in the axial direction (L) being a side opposite to the first side (L1) in the axial direction (L), and the vehicle drive device (100) further comprises: a first terminal block (91A) configured to electrically connect the inverter unit (90) to the first rotating electric machine (1A) and disposed in the first region (72A); and a second terminal block (91B) configured to electrically connect the inverter unit (90) to the second rotating electric machine (1B) and disposed in the second region (72B).

According to this configuration, it is possible to dispose the first terminal block (91A) at a position in the axial direction (L) at which the first terminal block (91A) can be easily electrically connected to the first rotating electric machine (1A), and dispose the second terminal block (91B) at a position in the axial direction (L) at which the second terminal block (91B) can be easily electrically connected to the second rotating electric machine (1B), while giving consideration to the positional relationship in the axial direction (L) between the first rotating electric machine (1A) and the second rotating electric machine (1B). Further, according to this configuration, the first terminal block (91A) and the second terminal block (91B) can be disposed in such a manner as to avoid a central region (72C) that is a region of the second section (71B) extended toward the second side (H2) in the width direction (H) relative to the first section (71A). It is thus possible to dispose constituent elements of the inverter unit (90) other than the first terminal block (91A) and the second terminal block (91B) in a region continuous in the width direction (H), including the first section (71A) and the central area (72C) of the second section (71B), thereby making it easier to appropriately dispose the constituent elements of the inverter unit (90) within the second containment chamber (70B).

It is preferable that the case (3) includes: a first surrounding wall (41A) surrounding the first rotating electric machine (1A); a second surrounding wall (41B) surrounding the second rotating electric machine (1B); and a joint wall (40C, 40D) serving as at least a portion of the second containment chamber (70B) and joining the first surrounding wall (41A) to the second surrounding wall (41B) in the axial direction (L).

According to this configuration, the joint walls (40C, 40D), which form at least portions of the second containment chamber (70B), can serve as reinforcing ribs that increase the rigidity of the recessed section in the case (3) that is formed between the first surrounding wall (41A) and the second surrounding wall (41B) in the axial direction (L). The joint walls (40C, 40D) for forming the second containment chamber (70B) can thus be used to reinforce the case (3), thereby making it easier to appropriately ensure the rigidity of the case (3).

DESCRIPTION OF REFERENCE SIGNS

1A: First rotating electric machine
1B: Second rotating electric machine
2A: First output member
2B: Second output member
3: Case
30: Case body member
31C: Third cover member (cover member)
40A: First side wall (wall section)
40B: Second side wall (wall section)
40C: Third side wall (wall section, joint wall)
40D: Fourth side wall (wall section, joint wall)
41A: First surrounding wall
41B: Second surrounding wall
60: Partition wall section
61A: First partition wall (partition wall)
61B: Second partition wall (partition wall)

61C: Third partition wall (partition wall)
62A: First containment chamber section (section other than partition wall section and serving as at least a portion of first containment chamber)
62B: Second containment chamber section (section other than partition wall section and serving as at least a portion of second containment chamber)
70A: First containment chamber
70B: Second containment chamber
71A: First section
71B: Second section
72A: First region
72B: Second region
90: Inverter unit
91A: First terminal block
91B: Second terminal block
100: Vehicle drive device
H: Width direction
H1: First side in width direction
H2: Second side in width direction
L: Axial direction
L1: First side in axial direction
L2: Second side in axial direction
T: Motive power transmission mechanism
T1: First transmission system
T2: Second transmission system
V: Up-down direction
V1: Upper side
W1: First wheel
W2: Second wheel
X1: First axis
X2: Second axis

The invention claimed is:

1. A vehicle drive device comprising:
a first rotating electric machine;
a second rotating electric machine;
a first output member drivably coupled to a first wheel;
a second output member drivably coupled to a second wheel;
a motive power transmission mechanism;
an inverter unit configured to drive the first rotating electric machine and the second rotating electric machine; and
a case,
the motive power transmission mechanism including:
a first transmission system configured to transmit torque of the first rotating electric machine to at least the first output member; and
a second transmission system configured to transmit torque of the second rotating electric machine to at least the second output member,
the first rotating electric machine and the second rotating electric machine being disposed on a first axis,
the first output member and the second output member being disposed on a second axis different from the first axis, which is located above the second axis,
the first rotating electric machine and the second rotating electric machine being spaced apart from each other in an axial direction parallel to the first axis and the second axis,
the inverter unit being disposed between the first rotating electric machine and the second rotating electric machine in the axial direction in such a manner as to overlap the first rotating electric machine and the second rotating electric machine as viewed in the axial direction,
the case including:
a first containment chamber accommodating the first rotating electric machine, the second rotating electric machine, the first output member, the second output member, and the motive power transmission mechanism;
a second containment chamber accommodating the inverter unit; and
a case body member having, in an integrated manner:
a partition wall section being a section serving as a partition wall demarcating the first containment chamber and the second containment chamber;
a section being other than the partition wall section and serving as at least a portion of the first containment chamber; and
a second containment chamber section being a section other than the partition wall section and serving as at least a portion of the second containment chamber.

2. The vehicle drive device according to claim 1,
wherein the second containment chamber section includes a wall section extended from the partition wall section,
the case includes a cover member joined to the wall section, and
the partition wall section, the wall section, and the cover member surround the second containment chamber.

3. The vehicle drive device according to claim 2,
wherein the case includes:
a first surrounding wall surrounding the first rotating electric machine;
a second surrounding wall surrounding the second rotating electric machine; and
a joint wall serving as at least a portion of the second containment chamber and joining the first surrounding wall to the second surrounding wall in the axial direction.

4. The vehicle drive device according to claim 2,
wherein the first axis is located on one side in a width direction relative to the second axis, the width direction being orthogonal to the axial direction as viewed in an up-down direction with the vehicle drive device being mounted in a vehicle, and
the inverter unit is disposed above the second axis in such a manner as to overlap at least one member disposed on the second axis as viewed in the up-down direction.

5. The vehicle drive device according to claim 4,
wherein the case includes:
a first surrounding wall surrounding the first rotating electric machine;
a second surrounding wall surrounding the second rotating electric machine; and
a joint wall serving as at least a portion of the second containment chamber and joining the first surrounding wall to the second surrounding wall in the axial direction.

6. The vehicle drive device according to claim 4,
wherein the second containment chamber includes:
a first section sandwiched between the first rotating electric machine and the second rotating electric machine in the axial direction; and
a second section on a second side in the width direction relative to the first section, the second side in the width direction being a side opposite to a first side in the width direction on which the first axis is located relative to the second axis in the width direction,
the second section has a larger dimension in the axial direction than the first section, and the second section has a portion overlapping the first containment chamber as viewed in the width direction.

7. The vehicle drive device according to claim 6, wherein the case includes:
   a first surrounding wall surrounding the first rotating electric machine;
   a second surrounding wall surrounding the second rotating electric machine; and
   a joint wall serving as at least a portion of the second containment chamber and joining the first surrounding wall to the second surrounding wall in the axial direction.

8. The vehicle drive device according to claim 6, wherein the second section includes:
   a first region extended from the first section toward a first side in the axial direction; and
   a second region extended from the first section toward a second side in the axial direction,
   the first side in the axial direction being a side on which the first rotating electric machine is disposed relative to the second rotating electric machine in the axial direction, the second side in the axial direction being a side opposite to the first side in the axial direction, and
   the vehicle drive device further comprises:
   a first terminal block configured to electrically connect the inverter unit to the first rotating electric machine and disposed in the first region; and
   a second terminal block configured to electrically connect the inverter unit to the second rotating electric machine and disposed in the second region.

9. The vehicle drive device according to claim 8, wherein the case includes:
   a first surrounding wall surrounding the first rotating electric machine;
   a second surrounding wall surrounding the second rotating electric machine; and
   a joint wall serving as at least a portion of the second containment chamber and joining the first surrounding wall to the second surrounding wall in the axial direction.

10. The vehicle drive device according to claim 1, wherein the first axis is located on one side in a width direction relative to the second axis, the width direction being orthogonal to the axial direction as viewed in an up-down direction with the vehicle drive device being mounted in a vehicle, and
    the inverter unit is disposed above the second axis in such a manner as to overlap at least one member disposed on the second axis as viewed in the up-down direction.

11. The vehicle drive device according to claim 10, wherein the case includes:
    a first surrounding wall surrounding the first rotating electric machine;
    a second surrounding wall surrounding the second rotating electric machine; and
    a joint wall serving as at least a portion of the second containment chamber and joining the first surrounding wall to the second surrounding wall in the axial direction.

12. The vehicle drive device according to claim 10, wherein the second containment chamber includes:
    a first section sandwiched between the first rotating electric machine and the second rotating electric machine in the axial direction; and
    a second section on a second side in the width direction relative to the first section, the second side in the width direction being a side opposite to a first side in the width direction on which the first axis is located relative to the second axis in the width direction,
    the second section has a larger dimension in the axial direction than the first section, and
    the second section has a portion overlapping the first containment chamber as viewed in the width direction.

13. The vehicle drive device according to claim 12, wherein the case includes:
    a first surrounding wall surrounding the first rotating electric machine;
    a second surrounding wall surrounding the second rotating electric machine; and
    a joint wall serving as at least a portion of the second containment chamber and joining the first surrounding wall to the second surrounding wall in the axial direction.

14. The vehicle drive device according to claim 12, wherein the second section includes:
    a first region extended from the first section toward a first side in the axial direction; and
    a second region extended from the first section toward a second side in the axial direction,
    the first side in the axial direction being a side on which the first rotating electric machine is disposed relative to the second rotating electric machine in the axial direction, the second side in the axial direction being a side opposite to the first side in the axial direction, and
    the vehicle drive device further comprises:
    a first terminal block configured to electrically connect the inverter unit to the first rotating electric machine and disposed in the first region; and
    a second terminal block configured to electrically connect the inverter unit to the second rotating electric machine and disposed in the second region.

15. The vehicle drive device according to claim 14, wherein the case includes:
    a first surrounding wall surrounding the first rotating electric machine;
    a second surrounding wall surrounding the second rotating electric machine; and
    a joint wall serving as at least a portion of the second containment chamber and joining the first surrounding wall to the second surrounding wall in the axial direction.

16. The vehicle drive device according to claim 1, wherein the case includes:
    a first surrounding wall surrounding the first rotating electric machine;
    a second surrounding wall surrounding the second rotating electric machine; and
    a joint wall serving as at least a portion of the second containment chamber and joining the first surrounding wall to the second surrounding wall in the axial direction.

\* \* \* \* \*